US010619694B2

(12) United States Patent
Yamashita

(10) Patent No.: US 10,619,694 B2
(45) Date of Patent: Apr. 14, 2020

(54) SHOCK ABSORBER

(71) Applicant: HITACHI AUTOMOTIVE SYSTEMS, LTD., Ibaraki (JP)

(72) Inventor: Mikio Yamashita, Zama (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/759,453

(22) PCT Filed: Sep. 14, 2016

(86) PCT No.: PCT/JP2016/077155
§ 371 (c)(1),
(2) Date: Mar. 12, 2018

(87) PCT Pub. No.: WO2017/047661
PCT Pub. Date: Mar. 23, 2017

(65) Prior Publication Data
US 2018/0216690 A1      Aug. 2, 2018

(30) Foreign Application Priority Data

Sep. 14, 2015   (JP) ................................ 2015-181064

(51) Int. Cl.
*F16F 9/18*     (2006.01)
*F16F 9/348*    (2006.01)
(Continued)

(52) U.S. Cl.
CPC ............... *F16F 9/185* (2013.01); *F16F 9/19* (2013.01); *F16F 9/348* (2013.01); *F16F 9/512* (2013.01);
(Continued)

(58) Field of Classification Search
CPC .... F16F 9/185; F16F 9/19; F16F 9/512; F16F 9/348; F16F 9/5165; F16F 9/342;
(Continued)

(56) References Cited

U.S. PATENT DOCUMENTS 8,584,818 B2 * 11/2013  Murakami .............. F16F 9/348
                                                   188/322.15
8,794,405 B2 *  8/2014  Yamashita ............. B60G 13/08
                                                   188/317
(Continued)

FOREIGN PATENT DOCUMENTS

JP    2003-278819    10/2003
JP    2008-249107    10/2008
(Continued)

OTHER PUBLICATIONS

International Search Report dated Dec. 13, 2016 in International Application No. PCT/JP2016/077155.

*Primary Examiner* — Vishal R Sahni
(74) *Attorney, Agent, or Firm* — Wenderoth, Lind & Ponack, L.L.P.

(57) ABSTRACT

A shock absorber including: a first passage (101) allowing working fluid to flow out from one chamber (19) as a result of movement of a piston (18); a second passage (181) provided in parallel with the first passage; a damping force generating mechanism (41) provided in the first passage, and configured to generate a damping force; a tubular case member (140) including at least a part of the second passage formed therein; an annular disc (134) supported on an inner peripheral side or an outer peripheral side in the case member. An annular seal member (156) configured to seal a gap to the case member is provided on a non-supported side of the annular disc. The shock absorber further includes two chambers (171, 172) in the case member, which are defined (Continued)

and provided by the disc. The disc is configured to block flow to the second passage.

9 Claims, 21 Drawing Sheets

(51) Int. Cl.
    *F16F 9/19*           (2006.01)
    *F16F 9/512*         (2006.01)
    *B60G 13/08*         (2006.01)
    *F16F 9/06*          (2006.01)

(52) U.S. Cl.
    CPC .......... *B60G 13/08* (2013.01); *B60G 2202/24* (2013.01); *B60G 2204/128* (2013.01); *B60G 2204/129* (2013.01); *B60G 2206/41* (2013.01); *B60G 2500/11* (2013.01); *B60G 2600/182* (2013.01); *B60G 2600/21* (2013.01); *B60G 2800/162* (2013.01); *F16F 9/062* (2013.01); *F16F 2228/066* (2013.01); *F16F 2230/00* (2013.01)

(58) Field of Classification Search
    CPC .......... F16F 9/48; F16F 9/062; F16F 2230/00; B60G 17/00; B60G 17/08
    See application file for complete search history.

(56) References Cited

U.S. PATENT DOCUMENTS

| | | | |
|---|---|---|---|
| 10,012,283 | B2* | 7/2018 | Yamashita .............. F16F 9/342 |
| 2008/0236966 | A1* | 10/2008 | Yamaguchi ............. F16F 9/465 |
| | | | 188/275 |
| 2010/0044173 | A1 | 2/2010 | Niculescu |
| 2011/0024247 | A1 | 2/2011 | Chikamatsu |
| 2011/0186393 | A1* | 8/2011 | Maeda .................. F16F 9/3488 |
| | | | 188/280 |
| 2011/0209956 | A1* | 9/2011 | Maeda .................. F16F 9/3488 |
| | | | 188/322.13 |
| 2011/0214953 | A1 | 9/2011 | Maeda et al. |
| 2014/0252735 | A1* | 9/2014 | Yamashita .............. F16F 9/342 |
| | | | 280/6.157 |
| 2015/0217621 | A1* | 8/2015 | Yamashita ............. B60G 13/08 |
| | | | 188/266.2 |
| 2015/0247547 | A1 | 9/2015 | Yamashita et al. |

FOREIGN PATENT DOCUMENTS

| | | |
|---|---|---|
| JP | 2008-309215 | 12/2008 |
| JP | 2011-158019 | 8/2011 |
| JP | 2011-202800 | 10/2011 |
| WO | 2009/102046 | 8/2009 |
| WO | 2014/045965 | 8/2016 |

* cited by examiner

SHOCK ABSORBER

TECHNICAL FIELD

The present invention relates to a shock absorber.

BACKGROUND ART

There has been given a shock absorber having a variable damping force characteristic that is variable in accordance with a vibration state (see, for example, Patent Literature 1).

CITATION LIST

Patent Literature

PTL 1: JP 2011-202800 A

SUMMARY OF INVENTION

Technical Problem

There has been a demand for downsizing of a shock absorber.

The present invention therefore has an object to provide a shock absorber capable of downsizing thereof.

Solution to Problem

To achieve the above-described object, the present invention includes: a first passage allowing working fluid to flow out from one of chambers in a cylinder as a result of movement of a piston; a second passage provided in parallel with the first passage; a damping force generating mechanism provided in the first passage, and configured to generate a damping force; a tubular case member inside which at least a part of the second passage is formed; an annular disc supported on an inner peripheral side or an outer peripheral side in the case member, an annular seal member configured to seal a gap to the case member being provided on a non-supported side; and two chambers in the case member defined and provided by the disc. The disc is configured to block flow in the second passage.

Advantageous Effects of Invention

With the present invention, the downsizing can be achieved.

DESCRIPTION OF EMBODIMENTS

First Embodiment

With reference to FIG. 1 to FIG. 4, description is made of a first embodiment of the present invention. Hereinafter, for the convenience of description, a top side of the diagrams is referred to as "top", and a bottom side of the diagrams is referred to as "bottom".

Figure 1:
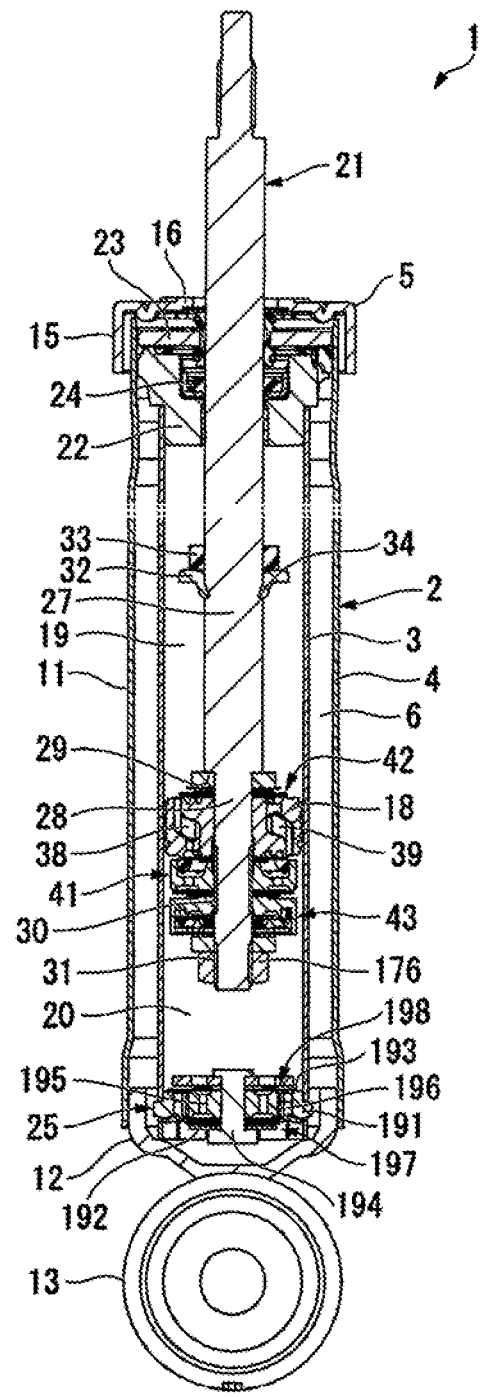
FIG. 1 is a sectional view for illustrating a shock absorber according to a first embodiment of the present invention.

As illustrated in FIG. 1, a shock absorber 1 of the first embodiment is a hydraulic shock absorber of the so-called twin-tube type, and includes a cylinder 2 which sealingly encloses oil liquid serving as working fluid. The cylinder 2 includes an inner tube 3 having a cylindrical shape, an outer tube 4 having a bottomed cylindrical shape, and a cover 5. The outer tube 4 has a larger diameter than the inner tube 3. The outer tube 4 is provided coaxially with the inner tube 3 so as to cover the inner tube 3. The cover 5 is configured to cover a top opening side of the outer tube 4. A reservoir chamber 6 is formed between the inner tube 3 and the outer tube 4.

The outer tube 4 includes a body member 11 having a cylindrical shape and a bottom member 12. The bottom member 12 is fitted and fixed to a bottom portion side of the body member 11, and is configured to close a bottom portion of the body member 11. A mounting eye 13 is fixed to the bottom member 12 on an outer side opposite to the body member 11.

The cover 5 includes a tubular part 15 and an inner flange part 16. The inner flange part 16 extends radially inward from a top end side of the tubular part 15. The cover 5 is placed over the body member 11 so as to cover a top end opening part of the body member 11 with the inner flange part 16, and cover an outer peripheral surface of the body member 11 with the tubular part 15. In this state, a part of the tubular part 15 is swaged radially inward so as to be fixed to the body member 11.

A piston 18 is slidably fitted in the inner tube 3 of the cylinder 2. The piston 18 is configured to partition an inside of the inner tube 3 into two chambers including an upper chamber 19 and a lower chamber 20. The oil liquid serving as the working fluid is sealingly enclosed inside the upper chamber 19 and the lower chamber 20 in the inner tube 3, and the oil liquid and gas serving as working fluids are sealingly enclosed in the reservoir chamber 6 between the inner tube 3 and the outer tube 4.

One end of a piston rod 21 extends to an outside of the cylinder 2, and the other end side is inserted into the cylinder 2. The piston 18 is coupled to the other end side of the piston rod 21 disposed in the cylinder 2. The piston 18 and the piston rod 21 integrally move. In an extension stroke in which a protrusion amount of the piston rod 21 from the cylinder 2 increases, the piston 18 moves toward the upper chamber 19 side. In a compression stroke in which the protrusion amount of the piston rod 21 from the cylinder 2 decreases, the piston 18 moves toward the lower chamber 20 side.

A rod guide 22 is fitted on top end opening sides of the inner tube 3 and the outer tube 4. A seal member 23 is installed on an upper side of the outer tube 4, which is an outer side of the cylinder 2 with respect to the rod guide 22. A friction member 24 is provided between the rod guide 22 and the seal member 23. The rod guide 22, the seal member 23, and the friction member 24 each have an annular shape, and the piston rod 21 is slidably inserted through respective insides of the rod guide 22, the friction member 24, and the seal member 23, and extends to the outside of the cylinder 2.

On this occasion, the rod guide 22 supports the piston rod 21 so as to allow axial movement while regulating radial movement, to thereby guide the movement of the piston rod 21. The seal member 23 is tightly mounted to the outer tube 4 on an outer peripheral portion thereof, and is brought into slide contact with an outer peripheral portion of the piston rod 21 moving axially in an inner peripheral portion thereof, thereby preventing the oil liquid in the inner tube 3 and the high pressure gas and the oil liquid in the reservoir chamber 6 in the outer tube 4 from leaking to the outside. The friction member 24 is brought into slide contact with the outer peripheral portion of the piston rod 21 on an inner peripheral portion thereof, thereby generating a friction resistance on the piston rod 21. The friction member 24 is not intended for sealing.

An outer peripheral portion of the rod guide 22 has a stepped shape having a larger diameter at an upper portion than a lower portion. The rod guide 22 is fitted to an inner peripheral portion of a top end of the inner tube 3 in the lower portion having the smaller diameter, and is fitted to an inner peripheral portion of an upper portion of the outer tube 4 in the upper portion having the larger diameter. A base valve 25 defining the lower chamber 20 and the reservoir chamber 6 is installed on the bottom member 12 of the outer tube 4, and an inner peripheral portion of a bottom end of the inner tube 3 is fitted to the base valve 25. A part (not shown) of a top end portion of the outer tube 4 is swaged radially inward, and this swaged portion and the rod guide 22 sandwich the seal member 23.

The piston rod 21 includes a main shaft part 27 and a mount shaft part 28 having a smaller diameter than the main shaft part 27. The mount shaft part 28 is disposed inside the cylinder 2, and the piston 18 and the like are mounted to the mount shaft part 28. An end portion on the mount shaft part 28 side of the main shaft part 27 forms a shaft step part 29 extending in a direction orthogonal to the axis. A Passage groove 30 extending in the axial direction is formed on an outer peripheral portion of the mount shaft part 28 at an intermediate position in the axial direction. A male thread 31 is formed at a tip position on a side opposite to the main shaft part 27 in the axial direction. The passage groove 30 is formed so as to have a sectional shape of any one of a rectangle shape, a square shape, and a D shape on a plane orthogonal to a center axis of the piston rod 21.

A stopper member 32 and a buffer 33 each having an annular shape are provided on the piston rod 21 in a portion between the piston 18 of the main shaft part 27 and the rod guide 22. The stopper member 32 is configured to cause the piston rod 21 to pass on an inner peripheral side, and is swaged and fixed to a fixation groove 34 recessed radially inward of the main shaft part 27. The buffer 33 is also configured to cause the piston rod 21 to pass on an inside, and is disposed between the stopper member 32 and the rod guide 22.

Regarding the shock absorber 1, for example, a portion of the piston rod 21 protruding from the cylinder 2 is disposed on upper portion, and is supported by a vehicle body. The mounting eye 13 on the cylinder 2 side is disposed on lower side, and is coupled to a wheel side. Conversely, the cylinder 2 side may be supported by the vehicle body, and the piston rod 21 may be coupled to the wheel side. When the wheel vibrates due to travel, a position of the cylinder 2 and a position of the piston rod 21 change relative to each other due to the vibration, and the change is suppressed by a fluid resistance of a flow passage formed in at least one of the piston 18 and the piston rod 21. As described later in detail, the fluid resistance of the flow passage formed in at least one of the piston 18 and the piston rod 21 changes in accordance with a speed and an amplitude of the vibration, and comfortability is improved through the suppression of the vibration. In addition to the vibration generated by the wheel, an inertial force and a centrifugal force generated in the vehicle body due to the travel of the vehicle also act between the cylinder 2 and the piston rod 21. For example, the centrifugal force is generated in the vehicle body due to a change in a travel direction caused by a steering wheel operation, and a force based on the centrifugal force acts between the cylinder 2 and the piston rod 21. As described later, the shock absorber 1 has a satisfactory characteristic in terms of the vibration based on forces generated in the vehicle body due to the travel of the vehicle, and provides high stability during the vehicle travel.

Figure 2:
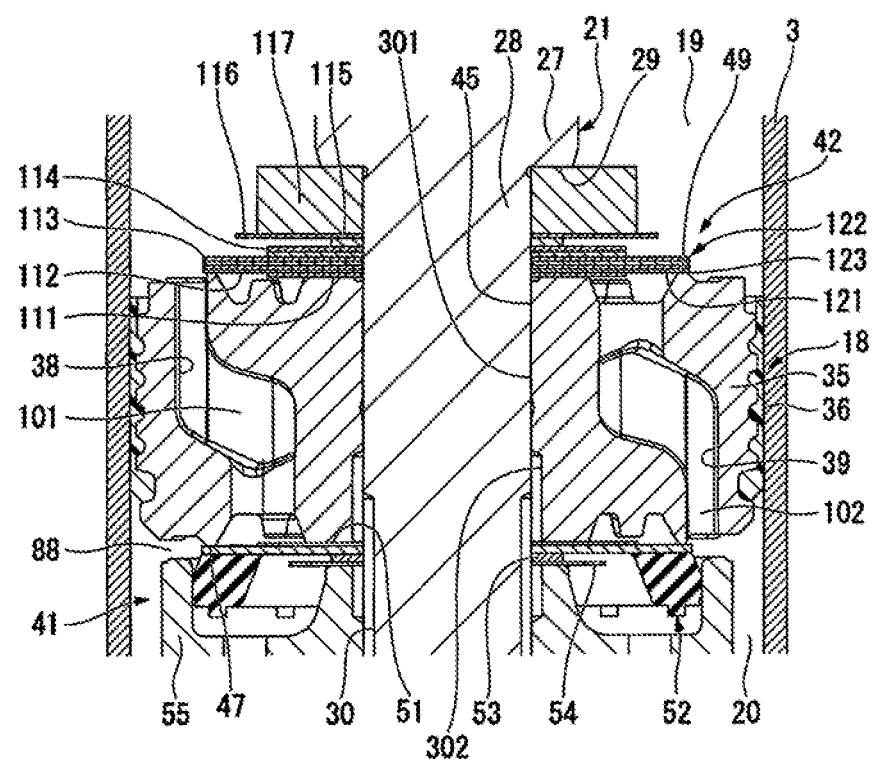
FIG. 2 is a partial sectional view around a piston for illustrating the shock absorber according to the first embodiment of the present invention.

As illustrated in FIG. 2, the piston 18 includes a piston main body 35 and a slide member 36. The piston main body 35 is made of metal, and is supported by the piston rod 21. The slide member 36 has an annular shape, and is made of synthetic resin. The slide member 36 is integrally mounted on an outer peripheral surface of the piston main body 35, and slides in the inner tube 3.

The piston main body 35 has a plurality of (only one location is illustrated because a cross section is illustrated in FIG. 2) passage holes 38 and a plurality of (only one location is illustrated because a cross section is illustrated in FIG. 2) passage holes 39. The passage holes 38 each internally form a passage which allows the upper chamber 19 and the lower chamber 20 to communicate with each other, and allows the oil liquid to flow out from the upper chamber 19 toward the lower chamber 20 during movement of the piston 18 toward the upper chamber 19, that is, in the extension stroke. The passage holes 39 each internally form a passage which allows the oil liquid to flow out from the lower chamber 20 toward the upper chamber 19 during movement of the piston 18 toward the lower chamber 20, that is, in the compression stroke. That is, the passages in the plurality of passage holes 38 and the passages in the plurality of passage holes 39 communicate with each other so that the oil liquid serving as the working fluid is allowed to flow between the upper chamber 19 and the lower chamber 20 by the movement of the piston 18. The passage holes 38 are formed at equal pitches respectively on both sides of the passage hole 39 at one location in a circumferential direction. The one side (top side of FIG. 2) of the passage hole 38 in the axial direction of the piston 18 opens on a radially outer side, and the other side (bottom side of FIG. 2) in the axial direction opens on a radially inner side.

Figure 3:
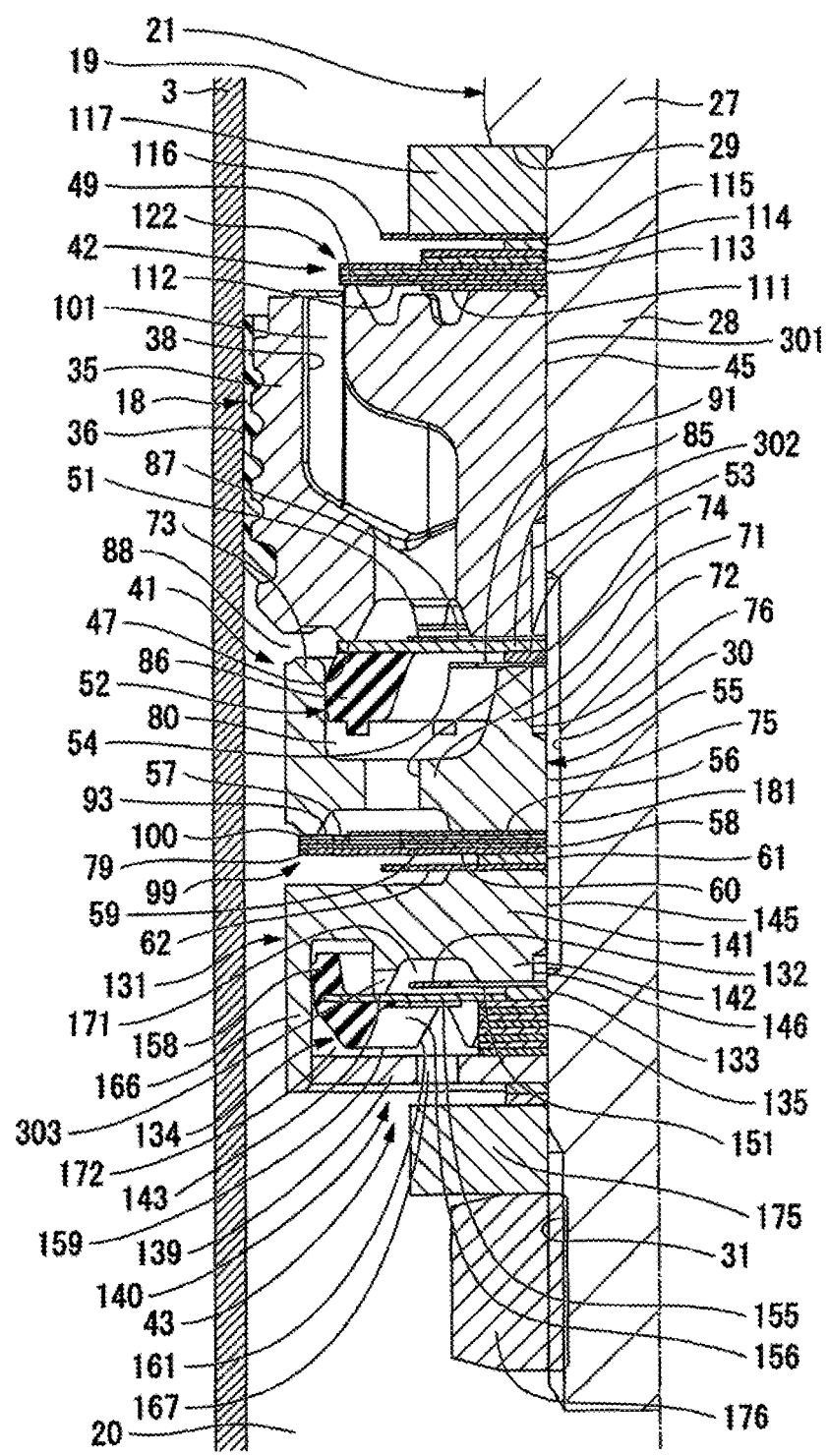
FIG. 3 is a partial sectional view for illustrating the shock absorber according to the first embodiment of the present invention, and is an illustration of a part around the piston, damping force generating mechanisms, and a damping force changing mechanism.
Figure 4:
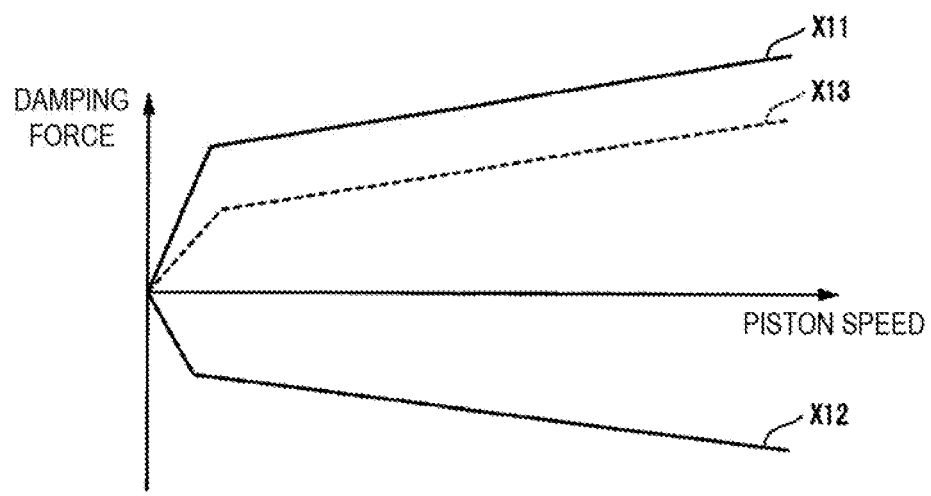
FIG. 4 is a characteristic line diagram for conceptually illustrating a relationship between a damping force and a piston speed of the shock absorber according to the first embodiment of the present invention.

As illustrated in FIG. 3, a damping force generating mechanism 41 configured to generate a damping force is provided for the passage holes 38 which are a half of the holes. The damping force generating mechanism 41 is disposed on the lower chamber 20 side, which is the one end side in the axial direction of the piston 18, and is mounted to the piston rod 21. The passage holes 38 have the passages on the extension side which allow the oil liquid to pass when the piston rod 21 and the piston 18 move toward the extension side (top side of FIG. 3), and the damping force generating mechanism 41 provided therefor serves as a damping force generating mechanism on the extension side configured to suppress the flow of the oil liquid through the passages in the passage holes 38 on the extension side, to thereby generate the damping force. A damping force changing mechanism 43 configured to change the damping force in response to a frequency (hereinafter referred to as "piston frequency)" of a reciprocal motion of the piston 18 in the extension stroke is mounted to the mount shaft part 28 of the piston rod 21 at a position adjacent to the damping force generating mechanism 41 on of the side opposite to the piston 18.

Moreover, as illustrated in FIG. 2, the passage holes 39, which are the remaining half of the holes, are formed at equal pitches respectively on both sides of the passage hole 38 at one location in the circumferential direction. The other side (bottom side of FIG. 2) of the passage hole 39 in the axis direction of the piston 18 opens on the radially outer side, and the one side (top side of FIG. 2) in the axis direction opens on the radially inner side.

Then, a damping force generating mechanism 42 configured to generate a damping force is provided for the passage holes 39, which are the remaining half of the holes. The damping force generating mechanism 42 is disposed on the upper chamber 19 side in the axis direction, which is the other end side in the axial direction of the piston 18, and is mounted to the piston rod 21. The passage holes 39 internally form the passages on the compression side which allows the oil liquid to pass when the piston rod 21 and the piston 18 move toward the compression side (bottom side of FIG. 2), and the damping force generating mechanism 42 provided therefor serves as a damping force generating mechanism on the compression side configured to suppress the flow of the oil liquid through the passages in the passage holes 39 on the compression side, to thereby generate the damping force.

The piston main body 35 has a generally disc shape. At a center of the piston main body 35 in a radial direction thereof, there is formed a fitting hole 45. The fitting hole 45 passes through the piston main body 35 in the axial direction, and is configured to fit the mount shaft part 28 of the piston rod 21. A portion between the fitting hole 45 and the passage hole 38 of an end portion on the lower chamber 20 side in the axial direction of the piston main body 35 supports an inner peripheral side of the damping force generating mechanism 41. A portion between the fitting hole 45 and the passage holes 39 of an end portion on the upper chamber 19 side in the axial direction of the piston main body 35 supports an inner peripheral side of the damping force generating mechanism 42.

An annular valve seat part 47, which is a part of the damping force generating mechanism 41, is formed on a radially outer side with respect to the openings on the lower chamber 20 side of the passage holes 38 in an end portion on the lower chamber 20 side in the axial direction of the piston main body 35. Moreover, an annular valve seat part 49, which is a part of the damping force generating mechanism 42, is formed on a radially outer side with respect to the openings on the upper chamber 19 side of the passage holes 39 in an end portion on the upper chamber 19 side in the axial direction of the piston main body 35. The fitting hole 45 of the piston main body 35 includes a small-diameter hole part 301 and a large-diameter hole part 302. The small-diameter hole part 301 is formed on a valve seat part 49 side in the axial direction, and is configured to fit the mount shaft part 28 of the piston rod 21. The large-diameter hole part 302 is formed on a valve seat part 47 side in the axial direction with respect to the small-diameter hole part 301. The piston large-diameter hole part 302 is formed on a seat member 55 side so as to face the piston rod 21.

In the piston main body 35, the side opposite to the fitting hole 45 of the valve seat part 47 forms a stepped shape having a height lower in the axis direction than the valve seat part 47, and the openings on the lower chamber 20 side of the passage holes 39 on the compression side are arranged in this portion having the stepped shape. Moreover, similarly, in the piston main body 35, the side opposite to the fitting hole 45 of the valve seat part 49 forms a stepped shape having a height lower in the axis direction than the valve seat part 49, and the openings on the upper chamber 19 side of the passage holes 38 on the extension side are arranged in this portion having the stepped shape.

As illustrated in FIG. 3, the damping force generating mechanism 41 on the extension side is a valve mechanism of a pressure control type, and includes one disc 51, one main valve 52, one disc 53, one disc 54, the one seat member 55, one disc 56, one disc 57, one disc 58, one disc 59, one disc 60, one disc 61, and one disc 62 arranged in the stated order from a piston 18 side in the axial direction. The discs 51, 53, 54, 56 to 62, and the seat member 55 are made of metal. The discs 51, 53, 54, and 56 to 62 each have a holed circular flat plate shape having a constant thickness and being capable of fitting the mount shaft part 28 of the piston rod 21 to an inside. The main valve 52 and the seat member 55 each have an annular shape capable of fitting the mount shaft part 28 of the piston rod 21 to an inside.

The seat member 55 includes a bottom part 71 having a holed disc shape, an inner cylindrical part 72 having a cylindrical shape, and an outer cylindrical part 73 having a cylindrical shape. The bottom part 71 extends along the direction orthogonal to the axis. The inner cylindrical part 72 is formed on an inner peripheral side of the bottom part 71, and extends along the axial direction. The outer cylindrical part 73 is formed on an outer peripheral side of the bottom part 71, and extends along the axial direction. The bottom part 71 is deviated toward the one side in the axial direction with respect to the inner cylindrical part 72 and the outer cylindrical part 73. The bottom part 71 has a through hole 74 passing through the bottom part 71 in the axial direction. On an inner side of the inner cylindrical part 72, a small-diameter hole part 75 configured to fit the mount shaft part 28 of the piston rod 21 is formed on a bottom part 71 side in the axial direction, and a large-diameter hole part 76 having a larger diameter than the small-diameter hole part 75 is formed on the side opposite to the bottom part 71 in the axial direction.

An end portion of the seat member 55 on the bottom part 71 side in the axial direction of the inner cylindrical part 72 supports an inner peripheral side of the disc 56, and an end portion on the side opposite to the bottom part 71 in the axial direction of the inner cylindrical part 72 supports an inner peripheral side of the disc 54. An end portion of the seat member 55 on the bottom part 71 side in the axial direction of the outer cylindrical part 73 serves as an annular valve seat part 79. An inside of the seat member 55 including the through hole 74 serves as a pilot chamber 80 configured to apply a pressure to the main valve 52 in the direction toward the piston 18.

The disc 51 has an outer diameter smaller than an inner diameter of the valve seat part 47. The main valve 52 includes a metal disc 85 and a rubber seal member 86 fixed to the disc 85. The disc 85 has a holed circular flat plate shape having a constant thickness capable of fitting the mount shaft part 28 of the piston rod 21 to an inside, and has an outer diameter slightly larger than an outer diameter of the valve seat part 47. The seal member 86 is fixed to an outer peripheral side of the disc 85 opposite to the piston 18, and has an annular shape.

The disc 51 has a through hole 87 passing through the disc 51 in the axial direction on a radially outer side with respect to the passage holes 38 of the piston main body 35. The disc 85 can be seated on the valve seat part 47 of the piston 18. The main valve 52 is provided between the passages in the passage holes 38 provided in the piston 18, and the pilot chamber 80 provided in the seat member 55, and is configured to suppress flow of the oil liquid generated by the slide of the piston 18 toward the extension side, to thereby generate the damping force. This main valve 52 is a disc valve.

The seal member 86 is brought into contact with an inner peripheral surface of the outer cylindrical part 73 of the seat member 55 over an entire periphery, to thereby seal a gap between the main valve 52 and the outer cylindrical part 73. Thus, the pilot chamber 80 between the main valve 52 and the seat member 55 is configured to apply an inner pressure toward the piston 18, that is, in a closing direction of allowing the disc 85 to be seated on the valve seat part 47, to the main valve 52. The through hole 87 of the disc 51, the large-diameter hole part 302 of the piston 18, the passage groove 30 of the piston rod 21, and a cutout 91 of the disc 54 serve as a passage for introducing the oil liquid from the upper chamber 19 in the cylinder 2 into the pilot chamber 80 via the passages in the passage holes 38. The main valve 52 is a damping valve of a pilot type including the pilot chamber 80, and is configured to allow the oil liquid from the passages in the passage holes 38 to flow to the lower chamber 20 via a passage 88 extending in the radial direction between the piston 18 and the outer cylindrical part 73 of the seat member 55 when the disc 85 separates from the valve seat part 47 of the piston 18 and thus opens. That is, the damping force generating mechanism 41 on the extension side is configured to introduce part of the flow of the oil liquid into the pilot chamber 80 via the passages in the through hole 87 of the disc 51, the large-diameter hole part 302 of the piston 18, the passage groove 30 of the piston rod 21, and the cutout 91 of the disc 54, to thereby control the opening of the main valve 52 through the pressure in the pilot chamber 80.

The disc 53 has an outer diameter smaller than an outer diameter of the inner cylindrical part 72 and larger than an inner diameter of the large-diameter hole part 76. The disc 54 is a common part including the same material and having the same shape as the disc 51, and the cutout 91 is formed on an inner peripheral side. The cutout 91 radially crosses a contact portion of the inner cylindrical part 72 with the disc 54, and a passage in the large-diameter hole part 76 of the seat member 55 and the pilot chamber 80 always communicate with each other via a passage in the cutout 91.

The disc 56 has an outer diameter smaller than an inner diameter of the valve seat part 79 of the seat member 55. The disc 57 has an outer diameter slightly larger than an outer diameter of the valve seat part 79, and is allowed to seat on the valve seat part 79. A cutout 93 is formed on an outer peripheral side of the disc 57, and the cutout 93 radially crosses the valve seat part 79.

The disc 58, the disc 59, and the disc 60 have the same outer diameters as the outer diameter of the disc 57. The disc 61 has an outer diameter smaller than the outer diameter of the disc 60. The disc 62 has an outer diameter larger than the outer diameter of the disc 61 and smaller than the outer diameter of the disc 60.

The discs 57 to 60 form a disc valve 99. The disc valve 99 is allowed to separably seat on the valve seat part 79, and separation of the disc valve 99 from the valve seat part 79 causes the pilot chamber 80 and the lower chamber 20 to communicate with each other, and suppress flow of the oil liquid therebetween. The pilot chamber 80 is formed so as to be surrounded by the main valve 52, the seat member 55, and the disc valve 99. The cutout 93 of the disc 57 serves as a fixed orifice 100 configured to cause the pilot chamber 80 to communicate with the lower chamber 20 even when the disc 57 abuts against the valve seat part 79. The disc 62 is brought into abutment against the disc 60 when the disc valve 99 deforms toward an open direction, to thereby suppress deformation of the disc valve 99.

The passages in the passage holes 38 on the extension side provided in the piston 18, the gap between the main valve 52 and the valve seat part 47 during opening, the passage 88 extending in the radial direction between the piston 18 and the outer cylindrical part 73, the through hole 87 provided in the disc 51, the large-diameter hole part 302 of the piston 18, the large-diameter hole part 76 of the seat member 55, the cut out 91 of the disc 54, the pilot chamber 80, the fixed orifice 100, and the gap between the disc valve 99 and the valve seat part 79 during opening form a first passage 101 on the extension side which allows the oil liquid to flow out from the upper chamber 19 toward the lower chamber 20 as a result of the movement of the piston 18 in the extension stroke. The damping force generating mechanism 41 on the extension side is provided in the first passage 101 on the extension side, and is configured to generate the damping force.

As illustrated in FIG. 2, the damping force generating mechanism 42 on the compression side includes one disc 111, one disc 112, a plurality of discs 113, a plurality of discs 114, one disc 115, one disc 116, and one annular member 117 arranged in the stated order from the piston 18 side in the axial direction. The discs 111 to 116 and the annular member 117 each are made of metal, have a holed circular flat plate shape having a constant thickness, and are capable of fitting the mount shaft part 28 of the piston rod 21 to an inside.

The disc 111 has an outer diameter smaller than an inner diameter of the valve seat part 49 of the piston 18. The disc 112 has an outer diameter slightly larger than an outer diameter of the valve seat part 49 of the piston 18, and is allowed to seat on the valve seat part 49. A cutout 121 is formed on an outer peripheral side of the disc 112, and the cutout 121 radially crosses the valve seat part 49.

The plurality of discs 113 are common parts including the same material and having the same shape as one another, and have the same outer diameters as the outer diameter of the disc 112. The plurality of discs 114 are common parts including the same material and having the same shape as one another, and have smaller outer diameters than the outer diameter of the discs 113. The disc 115 has an outer diameter smaller than the outer diameter of the discs 114. The disc 116 has an outer diameter larger than the outer diameter of the disc 114 and smaller than the outer diameter of the disc 113. The annular member 117 has a smaller outer diameter than the outer diameter of the disc 116, is thicker than the discs 111 to 116, and has thus higher rigidity. This annular member 117 abuts against the shaft step part 29 of the piston rod 21.

The discs 112 to 114 form a disc valve 122 which is allowed to separably seat on the valve seat part 49, and separation of the disc valve 122 from the valve seat part 49 causes the passages in the passage holes 39 to open to the upper chamber 19, and suppress flow of the oil liquid between the upper chamber 19 and the lower chamber 20. The cutout 121 of the disc 112 serves as a fixed orifice 123 configured to cause the upper chamber 19 and the lower chamber 20 to communicate with each other even when the disc 112 abuts against the valve seat part 49. The annular member 117 is configured to restrict deformation more than a prescribed amount of the disc valve 122 toward an open direction.

The passages in the passage holes 39 on the compression side provided in the piston 18, the fixed orifice 123, and the gap between the disc valve 122 and the valve seat part 49 during opening form a first passage 102 on the compression side which allows the oil liquid to flow out from the lower chamber 20 toward the upper chamber 19 as a result of the movement of the piston 18 in the compression stroke. The damping force generating mechanism 42 on the compression side is provided in the first passage 102 on the compression side, and is configured to generate the damping force.

In the first embodiment, the disc valve 99 on the extension side and the disc valve 122 on the compression side illustrated in FIG. 3 each are exemplified as a disc valve clamped at the inner periphery, but the configuration is not limited to this example. It is only necessary that a mechanism configured to generate the damping force be provided. For example, a valve of a lift type configured to bias a disc valve with a coil spring, or a poppet valve may be provided.

The damping force changing mechanism 43 includes one case member main body 131, one disc 132, one disc 133, one partition disc 134 (disc), a plurality of discs 135, and a lid member 139 arranged in the stated order from a damping force generating mechanism 41 side in the axial direction. The case member main body 131, the discs 132, 133, and 135, and the lid member 139 are made of metal. The discs 132, 133, and 135 each have a holed circular flat plate shape having a constant thickness capable of fitting the mount shaft part 28 as a shaft part of the piston rod 21 to an inside. The case member main body 131 and the lid member 139 each have an annular shape capable of fitting the mount shaft part 28 of the piston rod 21 to an inside.

The lid member 139 is fitted to a case member main body 131, thereby forming a tubular case member 140 together with the case member main body 131. The case member main body 131 includes a base part 141 having a holed disc shape, an inner cylindrical part 142 having a cylindrical shape, and a seat part 143 having a cylindrical shape. The base part 141 extends along the direction orthogonal to the axis. The inner cylindrical part 142 is formed on an inner peripheral side of the base part 141, and extends along the axial direction. The seat part 143 is formed on an outer peripheral side with respect to the inner cylindrical part 142 of the base part 141, and extends along the axial direction. The inner cylindrical part 142 protrudes toward both sides in the axial direction from the base part 141. The seat part 143 protrudes toward only one side in the axial direction from the base part 141. Inside the inner cylindrical part 142, a small-diameter hole part 145 configured to fit the mount shaft part 28 of the piston rod 21 is formed on an opposite side of the protruding direction of the seat part 143 in the axial direction, and a large-diameter hole part 146 having a larger diameter than the small-diameter hole part 145 is formed on a seat part 143 side in the axial direction. Moreover, a tubular part 166 having a cylindrical shape is formed on an outer peripheral side with respect to the seat part 143 of the base part 141.

The inner cylindrical part 142 of the case member main body 131 supports an inner peripheral side of the disc 62 at one end portion on a small-diameter hole part 145 side in the axial direction thereof, and support an inner peripheral side of the disc 132 at an opposite end portion on a large-diameter hole part 146 side in the axial direction thereof. The seat part 143 of the case member main body 131 supports an outer peripheral side of the partition disc 134 at an end portion on a protruding tip side thereof. Moreover, a cutout 303 is partially formed in a circumferential direction in the seat part 143, thereby causing a radially inner side and a radially outer side of the seat part 143 in the case member main body 131 to always communicate with each other.

The disc 132 has an outer diameter larger than a portion of the inner cylindrical part 142 in contact therewith, and smaller than an inner diameter of the seat part 143. A cutout 151 is formed on an inner peripheral side in the disc 132. The cutout 151 radially crosses the contact portion of the inner cylindrical part 142 with the disc 132. The disc 133 has an outer diameter smaller than the outer diameter of the disc 132.

The partition disc 134 includes a metal disc 155 and a rubber seal member 156 fixed on an outer peripheral side of the disc 155, and is elastically deformable. The disc 155 has a holed circular flat plate shape having a constant thickness, can be disposed so that an inside is separated from the disc 133, and has a thickness smaller than a thickness of the disc 133. The disc 155 has an outer diameter larger than an outer diameter of the seat part 143 of the case member main body 131.

The seal member 156 is fixed to the outer peripheral side of the disc 155 while forming an annular shape. The seal member 156 includes a seal main body part 158 having an annular shape, and a protruding part 159 having an annular shape. The seal main body part 158 protrudes from the disc 155 toward the side opposite to the lid member 139 in the axial direction. The protruding part 159 protrudes from the disc 155 toward a lid member 139 side in the axial direction. Moreover, an annular gap is provided between the disc 155 and the case member main body 131, and the seal member 156 fixes the seal main body part 158 and the protruding part 159 to both surfaces of the disc 155 via the gap. With this configuration, the fixation of the seal member 156 to the disc 155 is facilitated. In the seal main body part 158, an inner diameter at an end portion on a disc 155 side, that is, the minimum inner diameter is slightly larger than an outer diameter of the seat part 143. As a result, the disc 155 of the partition disc 134 is allowed to seat on the seat part 143 of the case member main body 131. The protruding part 159 has a radial groove 161, which is open on the side opposite to the disc 155 and passes through the protruding part 159 in the radial direction. The radial groove 161 allows the disc 155 of the partition disc 134 to be seated on the seat part 143 when a pressure in the lower chamber 20 exceeds a pressure in a variable chamber 171 described later. The cutout 303 is provided in the seat part 143, and pressure reception areas on a side on which the seal member main body 158 of the disc 155 is provided and on a side on which the protruding part 159 is provided are thus equivalent to each other.

The disc 135 has an outer diameter larger than an inner diameter of the disc 155 of the partition disc 134. As a result, an inner peripheral side of the partition disc 134 is supported so as to be movable in a range of an axial length of the disc 133 between the disc 132 and the disc 135. Moreover, the annular seal member 156 configured to seal the gap to the case member 140 is provided on an outer peripheral side, which is a non-supported side, in the partition disc 134. The seal member 156 is in contact with the case member 140, thereby being centered with respect to the case member 140. In other words, the inner peripheral side of the partition disc 134 has such a simple support structure in which the inner peripheral side is not clamped from both surface sides and is supported only on one surface side by the disc 135.

The lid member 139 has a holed disc shape capable of fitting the mount shaft part 28 of the piston rod 21 to an inside, and is fitted in the tubular part 166 of the case member main body 131. A through hole 167 axially passing through is formed in a radially intermediate portion in the lid member 139. The through hole 167 is formed on a radially outer side with respect to the disc 135 in the lid member 139, and is formed on a radially inner side with respect to the seal member 156, which is brought into contact with the lid member 139 as a result of deflection of the disc 155.

The seal main body part 158 of the partition disc 134 is in contact with an inner peripheral surface of the tubular part 166 of the case member main body 131 over an entire circumference, thereby sealing a gap between the partition disc 134 and the tubular part 166. That is, the partition disc 134 is a packing valve. The seal main body part 158 is configured to always seal the gap between the partition disc 134 and the tubular part 166 even when the partition disc 134 deforms in the case member 140 within an allowable range. The partition disc 134 is centered with respect to the case member 140 as described above through the contact of the seal main body part 158 of the partition disc 134 with the tubular part 166 over the entire circumference. The partition disc 134 is configured to partition an inside of the case member 140 into the variable chamber 171 having a variable volume on a base part 141 side of the case member main body 131 and a variable chamber 172 having a variable volume on a lid member 139 side. The variable chamber 171 is configured to communicate with a passage in the large-diameter hole part 146 of the case member main body 131 via a passage in the cutout 151 of the disc 132. The variable chamber 172 is configured to communicate with the lower chamber 20 via a passage in the through hole 167 of the lid member 139.

On the piston rod 21, there are provided the annular member 117, the disc 116, the disc 115, the plurality of discs 114, the plurality of discs 113, the disc 112, the disc 111, the piston 18, the disc 51, the main valve 52, the disc 53, the disc 54, the seat member 55, the disc 56, the disc 57, the disc 58, the disc 59, the disc 60, the disc 61, the disc 62, the case member main body 131, the disc 132, and the disc 133 which are stacked on the shaft step part 29 in the stated order while the mount shaft part 28 is passed through respective insides. The seat member 55 is configured to fit the seal member 86 of the main valve 52 to the outer cylindrical part 73.

Moreover, the partition disc 134 is stacked on the seat part 143 of the case member main body 131 while the disc 133 is passed through an inside. Further, the plurality of discs 135 and the lid member 139 are stacked on the disc 133 in the stated order while the mount shaft part 28 is passed through respective insides. The lid member 139 is fitted to the tubular part 166 of the case member main body 131. In addition, the annular member 175, which is a common part including the same material and having the same shape as the annular member 117, is stacked on the lid member 139 while the mount shaft part 28 is passed through an inside.

A nut 176 is threadedly engaged with the male thread 31 of the mount shaft part 28 protruding beyond the annular member 175 in the state in which the parts are arranged in this way. In this state, respective inner peripheral sides or entire portions of the annular member 117, the disc 116, the disc 115, the plurality of discs 114, the plurality of discs 113, the discs 112 and 111, the piston 18, the disc 51, the main valve 52, the discs 53 and 54, the seat member 55, the discs 56 to 62, the case member main body 131, the discs 132 and 133, the plurality of discs 135, the lid member 139, and the annular member 175 are sandwiched between the shaft step part 29 of the piston rod 21 and the nut 176, and are thus axially clamped. On this occasion, the inner peripheral side of the partition disc 134 is not axially clamped. The nut 176 is a general-purpose hexagonal nut.

In short, the damping force generating mechanism 42 on the compression side, the piston 18, the damping force generating mechanism 41 on the extension side, and the damping force changing mechanism 43 on the extension side are fastened to the piston rod 21 by the nut 176 while the piston rod 21 is passed through the respective inner peripheral sides. In other words, the piston 18, and the case member main body 131, the discs 132 and 133, the plurality of discs 135, and the lid member 139 forming the damping force changing mechanism 43 are fastened to the piston rod 21 by the nut 176 while the piston rod 21 is passed through the inner peripheral sides. The damping force changing mechanism 43 assembled in advance may be assembled to the piston rod 21. In this case, a dummy rod is passed through in place of the piston rod 21, and the mount shaft part 28 of the piston rod 21 is inserted through the inner peripheral side of the damping force changing mechanism 43 while the dummy rod is being pulled out. When the damping force changing mechanism 43 is assembled in advance, the lid member 139 can be pressed into the tubular part 166 of the case member main body 131 for fixing.

In this mounted state to the piston rod 21, the passage of the through hole 87 of the disc 51, the passage in the large-diameter hole part 302 of the piston 18, the passages in the passage grooves 30 of the piston rod 21, the passage in the large-diameter hole part 76 of the seat member 55 of the damping force generating mechanism 41 on the extension side, and the passage in the large-diameter hole part 146 of the case member main body 131 of the damping force changing mechanism 43 communicate with one another. As a result, the pilot chamber 80 always communicates with the variable chamber 171 of the damping force changing mechanism 43 via the passage in the cutout 91 of the disc 54, the passage in the large-diameter hole part 76 of the seat member 55, the passage in the passage groove 30 of the piston rod 21, the passage in the large-diameter hole part 146 of the case member main body 131, and the passage in the cutout 151 of the disc 132. Moreover, the variable chamber 172 of the damping force changing mechanism 43 always communicates with the lower chamber 20 via the through hole 167 of the lid member 139. The passage in the cutout 91, the passage in the large-diameter hole part 76, the passage in the passage groove 30, the passage in the large-diameter hole part 146, the passage in the cutout 151 of the disc 132, the variable chambers 171 and 172, and the passage in the through hole 167 form a second passage 181 on the extension side that branches from the first passage 101 on the extension side, and is disposed in parallel with the first passage 101 after the branch. Thus, the two variable chambers 171 and 172, which are at least a part of the second passage 181, are defined by the partition disc 134 and provided in the case member 140.

The partition disc 134 is deformable in a range in which an inner peripheral side thereof moves between the disc 132 and the disc 135, and an outer peripheral side thereof moves between the seat part 143 and the lid member 139. On this occasion, the minimum axial distance between the seat part 143 supporting the outer peripheral side of the disc 155 of the partition disc 134 from the one side in the axial direction and the disc 135 supporting an inner peripheral side of the disc 155 from the other side in the axial direction is less than an axial thickness of the disc 155. Thus, when the variable chambers 171 and 172 have the same pressure, the disc 155 is in pressure-contact with the seat part 143 and the disc 135 over an entire circumference in a slightly deformed state due to an elastic force of its own. The partition disc 134 is configured to block flow of the oil liquid between the variable chambers 171 and 172 of the second passage 181 in the state in which the inner peripheral side of the partition disc 134 is in contact with the disc 135 over the entire circumference. The partition disc 134 is set so as to be always in contact with the disc 135 over the entire circumference independently of the pressure state of the variable chambers 171 and 172, thereby always blocking the flow between the variable chambers 171 and 172 of the second passage 181. The partition disc 134 is configured to block the flow in the extension stroke, but may permit the flow in the compression stroke.

As illustrated in FIG. 1, the base valve 25 is provided between the bottom member 12 of the outer tube 4 and the inner tube 3. The base valve 25 includes a base valve member 191, a disc 192, a disc 193, and a mounting pin 194. The base valve member 191 partitions the lower chamber 20 and the reservoir chamber 6 from each other. The disc 192 is provided on a lower side of the base valve member 191, that is, on a reservoir chamber 6 side. The disc 193 is provided on an upper side of the base valve member 191, that is, on the lower chamber 20 side. The mounting pin 194 is configured to mount the disc 192 and the disc 193 to the base valve member 191.

The base valve member 191 has an annular shape, and the mounting pin 194 is inserted through a radial center thereof. The base valve member 191 has a plurality of passage holes 195 and a plurality of passage holes 196. The plurality of passage holes 195 allow the oil liquid to flow between the lower chamber 20 and the reservoir chamber 6. The plurality of passage holes 196 allow the oil liquid to flow between the lower chamber 20 and the reservoir chamber 6 on a radially outer side of the passage holes 195. The disc 192 on the reservoir chamber 6 side is configured to permit flow of the oil liquid from the lower chamber 20 to the reservoir chamber 6 via the passage holes 195, and, on the other hand, suppress flow of the oil liquid from the reservoir chamber 6 to the lower chamber 20 via the passage holes 195. The disc 193 is configured to permit flow of the oil liquid from the reservoir chamber 6 to the lower chamber 20 via the passage holes 196, and, on the other hand, suppress flow of the oil liquid from the lower chamber 20 to the reservoir chamber 6 via the passage holes 196.

The disc 192 together with the base valve member 191 form a damping valve 197 on the compression side configured to open in the compression stroke of the shock absorber 1, to thereby cause the oil liquid to flow from the lower chamber 20 to the reservoir chamber 6, and generate the damping force. The disc 193 together with the base valve member 191 form a suction valve 198 configured to open in the extension stroke of the shock absorber 1, to thereby cause the oil liquid to flow from the reservoir chamber 6 to the lower chamber 20. The suction valve 198 has a function of causing the liquid to flow from the reservoir chamber 6 to the lower chamber 20 so as to supplement an insufficient amount of the liquid mainly caused by the extension of the piston rod 21 from the cylinder 2 without substantially generating a damping force.

In the extension stroke in which the piston rod 21 moves toward the extension side, when only the damping force generating mechanism 41 on the extension side acts, and a moving speed (hereinafter referred to as piston speed) of the piston 18 is low, the oil liquid from the upper chamber 19 flows to the lower chamber 20 via the passages in the passage holes 38, the passage in the through hole 87 of the disc 51, the passage in the large-diameter hole part 302 of the piston 18, the passage in the passage groove 30 of the piston rod 21, the passage in the large-diameter hole part 76 of the seat member 55 of the damping force generating mechanism 41 on the extension side, the passage in the cutout 91 of the disc 54, the pilot chamber 80, and the fixed orifice 100 of the disc valve 99 forming the first passage 101 illustrated in FIG. 3, and the damping force in accordance with an orifice characteristic (the damping force is approximately proportional to the square of the piston speed) is generated. Therefore, as illustrated in a low speed region on a left side of a solid line X11 of FIG. 4, a characteristic of the damping force with respect to the piston speed is such that an increase rate of the damping force is relatively high with respect to increase in piston speed. Moreover, when the piston speed increases, the oil liquid from the upper chamber 19 flows to the lower chamber 20 from the passages in the passage holes 38, the passage in the through hole 87, the passage in the large-diameter hole part 302 of the piston 18, the passage in the passage groove 30 of the piston rod 21, the passage in the large-diameter hole part 76 of the seat member 55 of the damping force generating mechanism 41 on the extension side, the passage in the cutout 91 of the disc 54, and the pilot chamber 80 forming the first passage 101, via a gap between disc valve 99 and the valve seat part 79 while opening the disc valve 99, and a damping force in accordance with a valve characteristic (the damping force is approximately proportional to the piston speed) is generated. Therefore, as illustrated in a medium speed region in the middle in a right-and-left direction of the solid line X11 of FIG. 4, the characteristic of the damping force with respect to the piston speed is such that the increase rate of the damping force slightly decreases with respect to the increase in piston speed.

Moreover, when the piston speed further enters a high speed region, a relationship between the forces (hydraulic pressures) acting on the main valve 52 is such that a force in an opening direction acting from the passages in the passage holes 38 is larger than a force in a closing direction acting from the pilot chamber 80. Thus, in this region, the main valve 52 separates from the valve seat part 47 of the piston 18 and opens as the piston speed increases, to thereby cause, in addition to the flow to the lower chamber 20 from the passages in the passage holes 38, the passage in the through hole 87, the pilot chamber 80 forming the first passage 101 via the gap between the disc valve 99 and the valve seat part 79, the oil liquid to flow to the lower chamber 20 via the passage 88 between the piston 18 and the outer cylindrical part 73 of the seat member 55 also forming the first passage 101, and increase in damping force can thus be suppressed. On this occasion, as illustrated in the high speed region on the right side of the solid line X11 of FIG. 4, the characteristic of the damping force with respect to the piston speed is such that the state in which the increase rate of the damping force is slightly decreased with respect to the increase in piston speed is maintained.

In the compression stroke in which the piston rod 21 moves toward the compression side, when the piston speed is low, the oil liquid from the lower chamber 20 flows to the upper chamber 19 via the passages in the passage holes 39 and the fixed orifice 123 of the disc valve 122 forming the first passage 102 on the compression side illustrated in FIG. 2, and the damping force in accordance with the orifice characteristic (the damping force is approximately proportional to the square of the piston speed) is generated. Therefore, as illustrated in a low speed region on a left side of a solid line X12 of FIG. 4, a characteristic of the damping force with respect to the piston speed is such that the increase rate of the damping force is relatively high with respect to increase in piston speed. Moreover, when the piston speed increases, the oil liquid introduced from the lower chamber 20 into the passages in the passage holes 39 forming the first passage 102 on the compression side flows to the upper chamber 19 via the gap between the disc valve 122 and the valve seat part 49 while basically opening the disc valve 122, and a damping force in accordance with the valve characteristic (the damping force is approximately proportional to the piston speed) is generated. Therefore, as illustrated in a medium to high speed region from the middle to the right side in the right-and-left direction of the solid line X12 of FIG. 4, the characteristic of the damping force with respect to the piston speed is such that the increase rate of the damping force slightly decreases with respect to the increase in piston speed.

Description has been made of the case in which only the damping force generating mechanisms 41 and 42 act. However, in the first embodiment, the damping force changing mechanism 43 is capable of changing the damping force in accordance with the piston frequency even when the piston speed is the same.

That is, in the extension stroke at a high piston frequency, the pressure in the upper chamber 19 increases, and the oil liquid is introduced from the upper chamber 19 into the variable chamber 171 of the damping force changing mechanism 43 via the passages in the passage holes 38, the passage in the through hole 87 of the disc 51, the passage in the large-diameter hole part 302 of the piston 18, the passage in the passage groove 30 of the piston rod 21, and a portion on a pilot chamber 80 side with respect to the variable chamber 171 of the second passage 181 which are illustrated in FIG. 3. Accordingly, the oil liquid is discharged from the variable chamber 172 of the damping force changing mechanism 43, which is a portion on the lower chamber 20 side of the second passage 181, into the lower chamber 20 via the passage in the through hole 167 of the lid member 139. Accordingly, the partition disc 134, which has been in contact with the seat part 143 and the disc 135, deforms so that the protruding part 159 approaches the lid member 139.

The deformation of the partition disc 134 causes introduction of the oil liquid from the upper chamber 19 to the variable chamber 171, and a flow rate of the oil liquid flowing from the upper chamber 19 to the lower chamber 20 via the first passage 101 thus decreases. As a result, as indicated by a broken line X13 of FIG. 4 the damping force on the extension side becomes soft. The inner peripheral side of the partition disc 134 separates from the disc 132, and is supported only on one surface side by the disc 135. Thus, the inner peripheral side tends to deform so as to approach the disc 132, and the protruding part 159 on the outer peripheral side easily deforms so as to approach the lid member 139.

On the other hand, in the extension stroke at a low piston frequency, a frequency of the deformation of the partition disc 134 accordingly decreases, and hence the oil liquid flows from the upper chamber 19 to the variable chamber 171 in an initial stage of the extension stroke. However, the partition disc 134 is thereafter brought into abutment against the lid member 139 and stops thereat, and the oil liquid does not thus flow from the upper chamber 19 to the variable chamber 171. Therefore, a state in which the flow rate of the oil liquid which is introduced from the upper chamber 19 into the first passage 101 including the passages in the passage holes 38, passes through the damping force generating mechanism 41, and flows to the lower chamber 20 does not decrease is brought about. Thus, as indicated by the solid line X11 of FIG. 4, the damping force on the extension side becomes hard.

In the compression stroke, the pressure in the lower chamber 20 increases, but the partition disc 134 of the damping force changing mechanism 43 is brought into abutment against the seat part 143 of the case member main body 131, to thereby suppress the increase of the variable chamber 172, and an amount of the oil liquid introduced from the lower chamber 20 into the variable chamber 172 via the passage in the through hole 167 of the lid member 139 is thus suppressed. As a result, a state in which a flow rate of the oil liquid introduced from the lower chamber 20 into the passages in the passage holes 39, passing through the damping force generating mechanism 42, and flowing to the upper chamber 19 does not decrease is brought about, and, as indicated by the solid line X12 of FIG. 4, the damping force becomes hard. Moreover, the inner peripheral side of the partition disc 134 separates from the disc 135, a differential pressure is not thus generated, and the partition disc 134 does not deflect.

In a shock absorber disclosed in Patent Literature 1, a damping force changing mechanism is configured to move a free piston in a housing. Thus, an axial length is thus long, and a base length of the overall shock absorber is consequently long. Moreover, the housing of the damping force changing mechanism is threadedly engaged with a rod, and an assembly operation thus is complicated. A passage hole is formed in a piston rod, and machining thus is complicated.

In contrast, the damping force changing mechanism 43 in the first embodiment is configured to define the variable chambers 171 and 172 inside the case member main body 131 using the elastically deformable annular partition disc 134 provided with the annular seal member 156 configured to seal the gap to the case member main body 131. Thus, the axial length can thus be decreased, and the base length of the overall shock absorber 1 can consequently be decreased, thereby decreasing the size.

The axial length of the damping force changing mechanism 43 can be decreased, and the respective inner peripheral sides of the piston 18 and the case member main body 131 of the damping force changing mechanism 43 can be fastened to the piston rod 21 by the general-purpose nut 176 while the piston rod 21 is passed through. The piston 18 and the damping force changing mechanism 43 can thus easily be fastened to the piston rod 21, which significantly improves ease of assembly.

Moreover, the inner peripheral side of the partition disc 134 is not clamped from the both surface sides and is supported only on the one surface side. Thus, the partition disc 134 easily deforms, and the volumes of the variable chambers 171 and 172 can easily be changed. Thus, responsiveness of the damping force changing mechanism 43 can be improved.

Moreover, the damping force generating mechanism 41 on the extension side includes the main valve 52 and the pilot chamber 80. The main valve 52 is configured to suppress the flow of the oil liquid generated by the slide of the piston 18, to thereby generate the damping force. The pilot chamber 80 is configured to apply the pressure in the closing direction to the main valve 52. The damping force generating mechanism 41 is of the pressure control type of introducing part of the flow of the oil liquid into the pilot chamber 80, to thereby control the opening of the main valve 52 through the pressure in the pilot chamber 80. Therefore, even when a range of the change in volume of the damping force changing mechanism 43 is small, as indicated by the solid line X11 and the broken line X13 of FIG. 4, the damping force can be changed from the low speed region of the piston 18 in which the flow of the oil liquid from the upper chamber 19 to the lower chamber 20 has a low flow rate to the high speed region of the piston 18 in which the flow has a high flow rate. Thus, for example, an impact shock caused by the high piston speed and high frequency can be softened to improve comfortability.

Moreover, the portion of the second passage 181 formed in the piston rod 21 is formed as the passage groove 30 formed in the outer peripheral portion of the mount shaft part 28 of the piston rod 21, and machining can thus be easily performed.

Moreover, the damping force changing mechanism 43 configured to function in the extension stroke is provided, and a damping force changing mechanism configured to function in the compression stroke is not provided. Thus, the comfortability can be improved effectively for a road surface state and the like by changing the damping force in response to, for example, the piston frequency in the extension stroke while increase in cost is suppressed. Moreover, posture control is difficult through a shock absorber including a damping force changing mechanism configured to change the damping force in response to the piston frequency in the compression stroke, and it is preferred to effectively use the shock absorber including the damping force changing mechanism 43 configured to change the damping force in response to the piston frequency in the extension stroke for a vehicle to which the posture control is applicable.

Second Embodiment

Next, with reference to mainly FIG. 5 to FIG. 8, description is made of a second embodiment mainly in terms of a difference from the first embodiment. The same terms and the same reference symbols are given to components which are common to those of the first embodiment.

Figure 5:
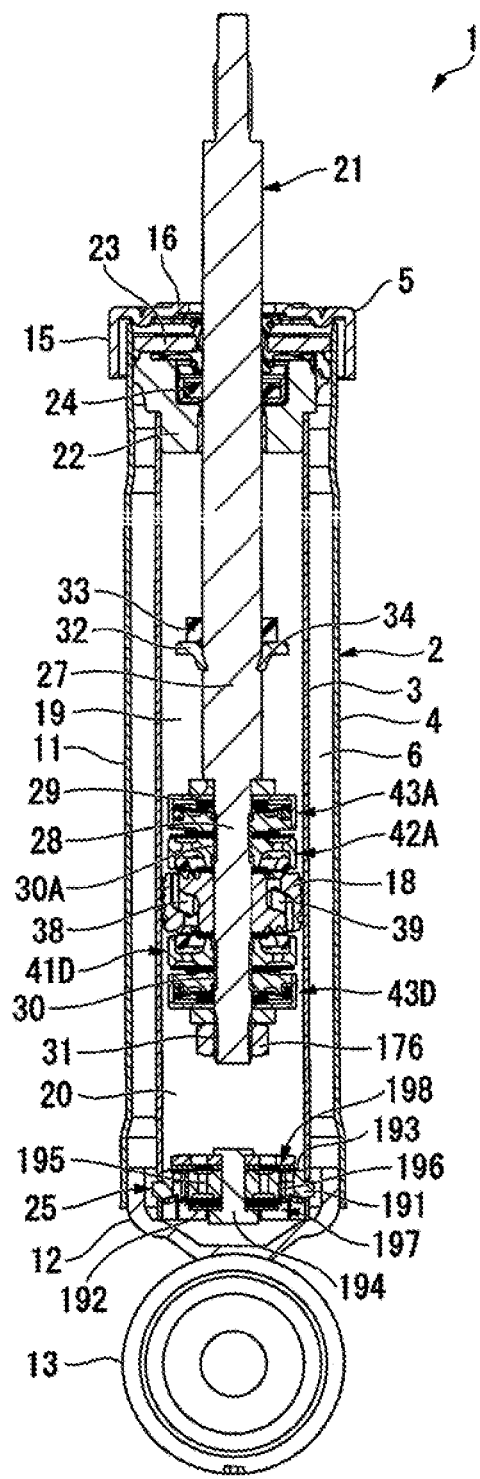
FIG. 5 is a sectional view for illustrating the shock absorber according to a second embodiment of the present invention.

As illustrated in FIG. 5, in the second embodiment, there are provided a damping force generating mechanism 41D on the extension side and a damping force generating mechanism 41D on the extension side. The damping force generating mechanism 41D on the extension side is partially different from the damping force generating mechanism 41 on the extension side in the first embodiment. The damping force changing mechanism 43D on the extension side is partially different from the damping force changing mechanism 43 on the extension side.

Figure 6:
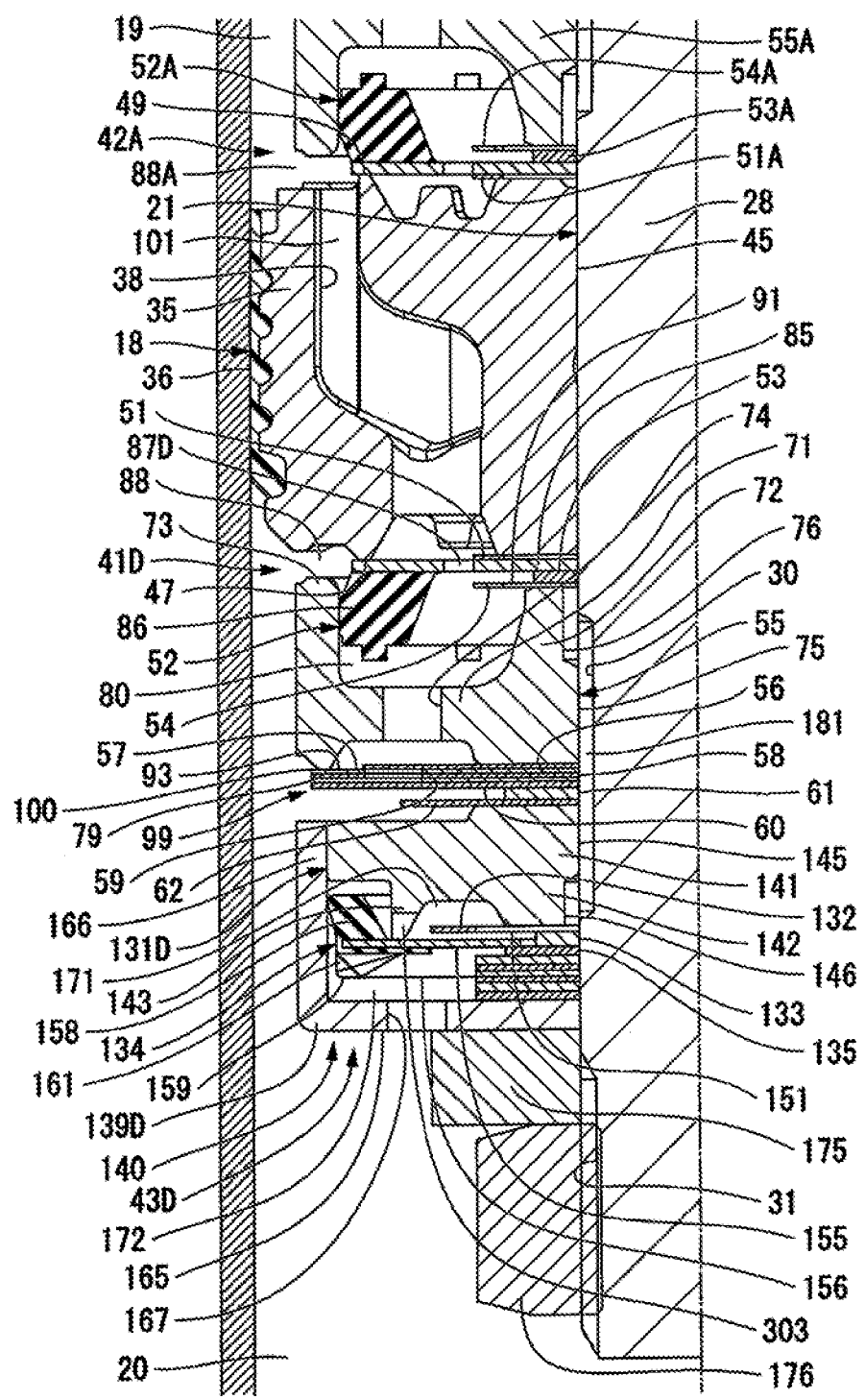
FIG. 6 is a partial sectional view for illustrating the shock absorber according to the second embodiment of the present invention, and is an illustration of a part around the piston, a damping force generating mechanism on an extension side, and a damping force changing mechanism on the extension side.

As illustrated in FIG. 6, in the damping force generating mechanism 41D, a through hole 87D is formed in the disc 85 of the main valve 52. With this configuration, an inside of the through hole 87D forms a passage configured to introduce the oil liquid from the upper chamber 19 in the cylinder 2 to the pilot chamber 80 via the passages in the passage holes 38. That is, the damping force generating mechanism 41D on the extension side is configured to introduce part of the flow of the oil liquid into the pilot chamber 80 via a passage in the through hole 87D of the main valve 52, to thereby control the opening of the main valve 52 through the pressure in the pilot chamber 80. Therefore, the passage is not formed in the disc 51, and the large-diameter hole part 302 is not formed in the piston 18. The passage groove 30 of the piston rod 21 is also shorter.

A lid member 131D having a shape without the tubular part 166 of the case member main body 131 is provided for the damping force changing mechanism 43D on the damping force generating mechanism 41D side in the axial direction. Moreover, a case member main body 139D has such a shape that the tubular part 166 is formed on the lid member 139 is provided for the damping force changing mechanism 43D on the damping force generating mechanism 41D side in the axial direction. The lid member 131D is fitted to the tubular part 166 of the case member main body 139D, to thereby form the tubular case member 140 together with the case member main body 139D.

In the second embodiment, a damping force generating mechanism 42A on the compression side having the same configuration as the damping force generating mechanism 41D on the extension side is provided, in place of the damping force generating mechanism 42 on the compression side of the first embodiment, on a main shaft part 27 side with respect to the piston 18. Moreover, in the second embodiment, a damping force changing mechanism 43A on the compression side configured to change the damping force in response to the piston frequency in the compression stroke is provided on a main shaft part 27 side with respect to the damping force generating mechanism 42A. The damping force changing mechanism 43A on the compression side has the same configuration as the damping force changing mechanism 43D on the extension side.

With the above-mentioned configuration, the mount shaft part 28 of the piston rod 21 of the second embodiment is longer than that of the first embodiment, and passage groove 30A extending in the axial direction is formed between the passage groove 30 and the main shaft par 27 in the outer peripheral portion of the mount shaft part 28.

As illustrated in FIG. 6, the damping force generating mechanism 42A on the compression side is a valve mechanism of the pressure control type, and includes one disc 51A, one main valve 52A, one disc 53A, one disc 54A, one seat member 55A, one disc 56A, one disc 57A, one disc 58A, one disc 59A, one disc 60A, one disc 61A, and one disc 62A arranged in the stated order from the piston 18 side in the axial direction. The discs 51A, 53A, 54A, and 56A to 62A each have a holed circular flat plate shape having a constant thickness capable of fitting the mount shaft part 28 of the piston rod 21 to an inside. The main valve 52A and the seat member 55A each have an annular shape capable of fitting the mount shaft part 28 of the piston rod 21 to an inside.

The seat member 55A is a common part including the same material and having the same shape as the seat member 55. Thus, similarly to the seat member 55, the seat member 55A includes a bottom part 71A, an inner cylindrical part 72A, and an outer cylindrical part 73A, and a thorough hole 74A is formed in the bottom part 71A. Moreover, a small-diameter hole part 75A and a large-diameter hole part 76A are formed inside the inner cylindrical part 72A.

One end portion in the axial direction of the inner cylindrical part 72A supports an inner peripheral side of the disc 56A, and the other end portion in the axial direction of the inner cylindrical part 72A supports an inner peripheral side of the disc 54A. One end portion in the axial direction of the outer cylindrical part 73A of the seat member 55A serves as an annular valve seat part 79A. An inside of the seat member 55A including the through hole 74A serves as a pilot chamber 80A configured to apply a pressure to the main valve 52A toward the direction toward the piston 18.

The disc 51A is a common part including the same material and having the same shape as the disc 51 of the damping force generating mechanism 41D on the extension side, and has an outer diameter smaller than the inner diameter of the valve seat part 49 of the piston 18. The main valve 52A is a common part including the same material and having the same shape as the main valve 52 of the damping force generating mechanism 41D on the extension side, and includes a disc 85A and a seal member 86A. The disc 85A has an outer diameter slightly larger than the outer diameter of the valve seat part 49, and a through hole 87A is formed therein. The disc 85A can be seated on the valve seat part 49 of the piston 18, and a passage in the through hole 87A communicate with the passages in the passage holes 39. The main valve 52A is provided between the passages in the passage holes 39 provided in the piston 18 and the pilot chamber 80A provided in the seat member 55A, and is configured to suppress flow of the oil liquid generated by the slide of the piston 18 toward the compression side, to thereby generate a damping force.

The main valve 52A is a damping valve of the pilot type including the pilot chamber 80A, and is configured to cause the oil liquid from the passages in the passage holes 39 to flow to the upper chamber 19 via a passage 88A extending in the radial direction between the piston 18 and the seat member 55A when the disc 85A separates from the valve seat part 49 of the piston 18 and thus opens. The damping force generating mechanism 42A on the compression side is configured to introduce part of the flow of the oil liquid into the pilot chamber 80A via the through hole 87A of the main valve 52A, to thereby control the opening of the main valve 52A through the pressure in the pilot chamber 80A.

The disc 53A is a common part including the same material and having the same shape as the disc 53. The disc 54A is a common part including the same material and having the same shape as the disc 54, and a cutout 91A is formed on an inner peripheral side. A passage in the large-diameter hole part 76A of the seat member 55A and the pilot chamber 80A communicate with each other via a passage in the cutout 91A.

The disc 56A is a common part including the same material and having the same shape as the disc 56. The disc 57A is a common part including the same material and having the same shape as the disc 57. The disc 57A has an outer diameter slightly larger than the outer diameter of the valve seat part 79A of the seat member 55A, and is allowed to seat on the valve seat part 79A. A cutout 93A is formed on an outer peripheral side of the disc 57A, and the cutout 93A radially crosses the valve seat part 79A.

The disc 58A is a common part including the same material and having the same shape as the disc 58. The disc 59A is a common part including the same material and having the same shape as the disc 59. The disc 60A is a common part including the same material and having the same shape as the disc 60. The disc 61A is a common part including the same material and having the same shape as the disc 61. The disc 62A is a common part including the same material and having the same shape as the disc 62.

The discs 57A to 60A form a disc valve 99A which is allowed to separably seat on the valve seat part 79A, and separation of the disc valve 99A from the valve seat part 79A causes the pilot chamber 80A and the upper chamber 19 to communicate with each other, and suppress flow of the oil liquid flowing therebetween. The pilot chamber 80A is formed so as to be surrounded by the main valve 52A, the seat member 55A, and the disc valve 99A. The cutout 93A of the disc 57A serves as a fixed orifice 100A configured to cause the pilot chamber 80A to communicate with the upper chamber 19 even when the disc 57A abuts against the valve seat part 79A.

The passages in the passage holes 39 on the compression side provided in the piston 18, a gap between the main valve 52A and the valve seat part 49 during opening, the passage 88A extending in the radial direction between the piston 18 and the outer cylindrical part 73A, the passage in the through hole 87A provided in the main valve 52A, the pilot chamber 80A, the fixed orifice 100A, and the gap between the disc valve 99A and the valve seat part 79A during opening form a first passage 102A on the compression side which allows the oil liquid to flow out from the lower chamber 20 toward the upper chamber 19 as a result of the movement of the piston 18 in the compression stroke. The damping force generating mechanism 42A on the compression side is provided in the first passage 102A, and is configured to generate the damping force.

The damping force changing mechanism 43A on the compression side includes one lid member 131A, one disc 132A, one disc 133A, one partition disc 134A (disc), a plurality of discs 135A, and a case member main body 139A arranged in the stated order from a damping force generating mechanism 42A side in the axial direction.

The lid member 131A is a common part including the same material and having the same shape as the lid member 131D, and is fitted to the case member main body 139A, thereby forming a tubular case member 140A together with the case member main body 139A. The lid member 131A includes a base part 141A, an inner cylindrical part 142A, and a seat part 143A. A small-diameter hole part 145A and a large-diameter hole part 146A are formed inside the inner cylindrical part 142A. A cutout 303A is provided for the seat part 143A.

The inner cylindrical part 142A of the lid member 131A supports an inner peripheral side of the disc 62A at one end portion thereof in the axial direction, and supports an inner peripheral side of the disc 132A on the other end portion thereof in the axial direction. An end portion of the seat part 143A of the lid member 131A supports the partition disc 134A. The disc 132A is a common part including the same material and having the same shape as the disc 132, and a cutout 151A is formed on an inner peripheral side. The disc 133A is a common part including the same material and having the same shape as the disc 133.

The partition disc 134A is a common part including the same material and having the same shape as the partition disc 134, and includes a disc 155A and a seal member 156A. The seal member 156A includes a seal main body part 158A and a protruding part 159A. The disc 155A of the partition disc 134A can be seated on the seat part 143A of the lid member 131A. A radial groove 161A is formed in the protruding part 159A.

An inner peripheral side of the partition disc 134A is supported so as to be movable in a range of an axial length of the disc 133A between the disc 132A and the disc 135A, and the annular seal member 156A configured to seal a gap to the case member 140A is provided on an outer peripheral side, which is a non-supported side. In other words, the partition disc 134A has such a simple support structure that the inner peripheral side is not clamped from both surface sides and is supported only on one surface side by the disc 135A.

The case member main body 139A is a common part including the same material and having the same shape as the case member main body 139D, and includes a bottom part 165A and a tubular part 166A. A through hole 167A is formed in the bottom part 165A.

The seal main body part 158A of the partition disc 134A is in contact with an inner peripheral surface of the tubular part 166A of the case member main body 139A over an entire circumference, thereby sealing a gap between the partition disc 134A and the tubular part 166A. The partition disc 134A partitions an inside of the case member 140A into a variable chamber 171A on a lid member 131A side in the axial direction and a variable chamber 172A on a bottom part 165A side of the case member main body 139A. The variable chamber 171A communicates with a passage in the large-diameter hole part 146A of the lid member 131A via a passage in the cutout 151A of the disc 132A. The variable chamber 172A communicates with the upper chamber 19 via a passage in the through hole 167A of the case member main body 139A.

On the piston rod 21, there are provided the annular member 117, the case member main body 139A, the plurality of discs 135A, and the disc 133A which are stacked on the shaft step part 29 in the stated order while the mount shaft part 28 is passed through respective insides. Moreover, the partition disc 134A is stacked on the disc 135A while the disc 133A is passed through an inside. Further, the disc 132A and the lid member 131A are stacked on the disc 133A in the stated order while the mount shaft part 28 is passed through respective insides. The lid member 131A is fitted to the tubular part 166A of the case member main body 139A.

Further, the disc 62A, the disc 61A, the disc 60A, the disc 59A, the disc 58A, the disc 57A, the disc 56A, the seat member 55A, the disc 54A, the disc 53A, the main valve 52A, the disc 51A, and the piston 18 are stacked on the lid member 131A in the stated order while the mount shaft part 28 is passed through respective insides. The main valve 52A fits the seal member 86A thereof to the outer cylindrical part 73A of the seat member 55A.

Figure 7:
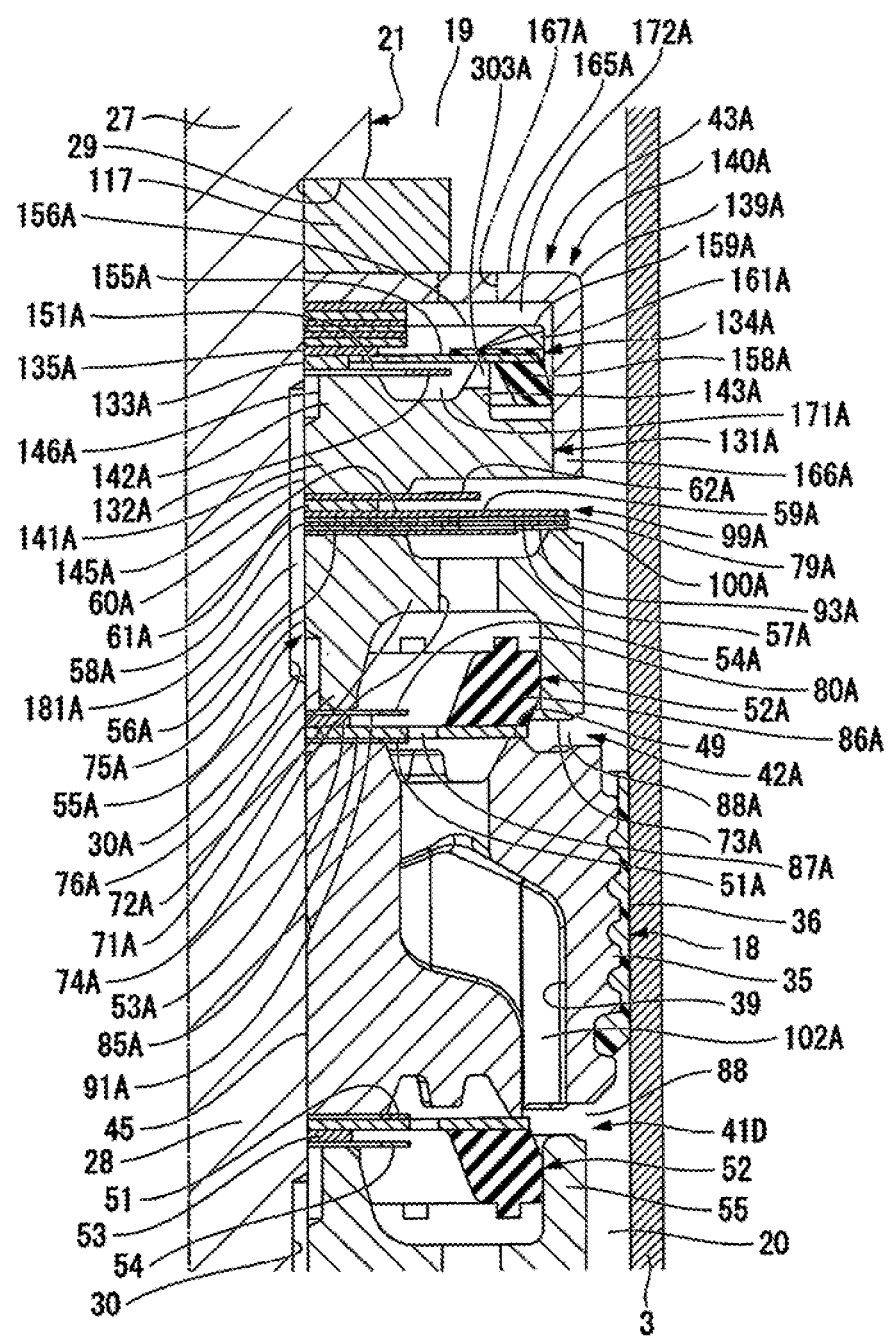
FIG. 7 is a partial sectional view for illustrating the shock absorber according to the second embodiment of the present invention, and is an illustration of a part around the piston, a damping force generating mechanism on a compression side, and a damping force changing mechanism on the compression side.
Figure 8:
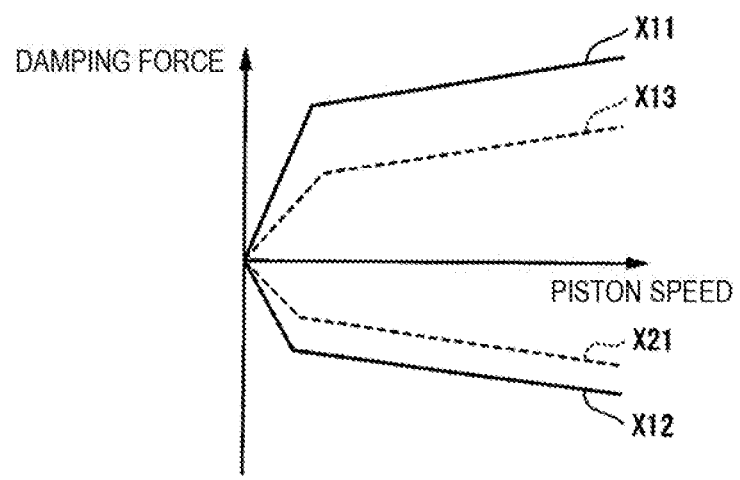
FIG. 8 is a characteristic line diagram for conceptually illustrating the relationship between the damping force and the piston speed of the shock absorber according to the second embodiment of the present invention.

Further, as illustrated in FIG. 7, the disc 51, the main valve 52, the disc 53, the disc 54, the seat member 55, the disc 56, the disc 57, the disc 58, the disc 59, the disc 60, the disc 61, the disc 62, the lid member 131D, the disc 132, and the disc 133 are stacked on the piston 18 in the stated order while the mount shaft part 28 is passed through respective insides. The seat member 55 fits the seal member 86 of the main valve 52 to the outer cylindrical part 73.

Moreover, the partition disc 134 is stacked on the lid member 131D while the disc 133 is passed through an inside. Further, the plurality of discs 135, the case member main body 139D, and the annular member 175 are stacked on the disc 133 in the stated order while the mount shaft part 28 is passed through respective insides. The case member main body 139D causes the tubular part 166 to fit to the lid member 131D.

The nut 176 is threadedly engaged with the male thread 31 of the mount shaft part 28 protruding beyond the annular member 175 in the state in which the parts are arranged in this way. With this, respective inner peripheral sides or entire portions of the annular member 117, the case member main body 139A, the plurality of discs 135A, the discs 133A and 132A, the lid member 131A, the discs 62A, 61A, 60A, 59A, 58A, 57A, and 56A, the seat member 55A, the discs 54A and 53A, the main valve 52A, the disc 51A, the piston 18, the disc 51, the main valve 52, the discs 53 and 54, the seat member 55, the discs 56, 57, 58, 59, 60, 61, and 62, the lid member 131D, the discs 132 and 133, the plurality of discs 135, the case member main body 139D, and the annular member 175 are sandwiched between the shaft step part 29 of the piston rod 21 and the nut 176, and are thus axially clamped. On this occasion, the inner peripheral sides of the partition discs 134A and 134 are not axially clamped.

In short, the damping force change mechanism 43A on the compression side, the damping force generating mechanism 42A on the compression side, the piston 18, the damping force generating mechanism 41D on the extension side, and the damping force changing mechanism 43D on the extension side are fastened to the piston rod 21 by the nut 176 while the piston rod 21 is passed through the respective inner peripheral sides. In other words, the piston 18; the lid member 131D, the discs 132 and 133, the plurality of discs 135, and the case member main body 139D forming the damping force changing mechanism 43D on the extension side; and the lid member 131A, the discs 132A and 133A, the plurality of discs 135A and the case member main body 139A forming the damping force changing mechanism 43A on the compression side are fastened to the piston rod 21 by the nut 176 while the piston rod 21 is passed through the inner peripheral sides. The damping force changing mechanisms 43A and 43D assembled in advance may be assembled to the piston rod 21.

In this mounted state to the piston rod 21, as illustrated in FIG. 7, the passage in the passage groove 30 of the piston rod 21, the passage in the large-diameter hole part 76 of the seat member 55 of the damping force generating mechanism 41D on the extension side, and the passage in the large-diameter hole part 146 of the lid member 131D of the damping force changing mechanism 43D on the extension side communicate with one another. As a result, the pilot chamber 80 of the damping force generating mechanism 41D on the extension side always communicates with the variable chamber 171 of the damping force changing mechanism 43D on the extension side as in the first embodiment. Moreover, the variable chamber 172 always communicates with the lower chamber 20.

Moreover, as illustrated in FIG. 6, the passage in the passage groove 30A of the piston rod 21, the passage in the large-diameter hole part 76A of the seat member 55A of the damping force generating mechanism 42A on the compression side, and the passage in the large-diameter hole part 146A of the lid member 131A of the damping force changing mechanism 43A on the compression side communicate with one another.

Additionally, the pilot chamber 80A of the damping force generating mechanism 42A on the compression side always communicates with the variable chamber 171A of the damping force changing mechanism 43A on the compression side via the passage in the cutout 91A of the disc 54A, the passage in the large-diameter hole part 76A of the seat member 55A, the passage in the passage groove 30A of the piston rod 21, the passage in the large-diameter hole part 146A of the lid member 131A, and the passage in the cutout 151A of the disc 132A. Moreover, the variable chamber 172A of the damping force changing mechanism 43A on the compression side always communicates with the upper chamber 19 via the through hole 167A of the case member 140A. The passage in the cutout 91A, the passage in the large-diameter hole part 76A, the passage in the passage groove 30A, the passage in the large-diameter hole part 146A, the passage in the cutout 151A, the variable chambers 171A and 172A, and the passage in the through hole 167A form a second passage 181A that branches from the first passage 102A, and is disposed in parallel with the first passage 102A after the branch. Thus, the two variable chambers 171A and 172A, which are at least a part of the second passage 181A, are defined by the partition disc 134A, and are provided inside the case member 140A. The partition disc 134A always blocks the flow in the second passage 181A.

In the second embodiment, the extension stroke in which the piston rod 21 moves toward the extension side operates as in the first embodiment, and the compression stroke in which the piston rod 21 moves toward the compression side is different from the first embodiment.

In the compression stroke at a high piston frequency, when the pressure in the lower chamber 20 increases, the oil liquid is introduced from the lower chamber 20 to the variable chamber 171A of the damping force changing mechanism 43A via the passages in the passage holes 39, the pilot chamber 80A, and the portion of the second passage 181A on the pilot chamber 80A side with respect to the variable chamber 171A illustrated in FIG. 6. Accordingly, the oil liquid is discharged from the variable chamber 172A of the damping force changing mechanism 43A, which is a portion of the second passage 181A on the lower chamber 20 side, into the upper chamber 19 via the passage in the through hole 167A of the case member 140A. Accordingly, the partition disc 134A, which has abutted against the seat part 143A and the disc 135A, deforms so that the protruding part 159A approaches the bottom part 165A of the case member 140A.

The deformation of the partition disc 134A causes introduction of the oil liquid from the lower chamber 20 to the variable chamber 171A, and a flow rate of the oil liquid flowing from the lower chamber 20 to the upper chamber 19 via the first passage 102A decreases. As a result, as indicated by the broken line X21 of FIG. 8, the damping force on the compression side becomes soft. On this occasion, the inner peripheral side of the partition disc 134A separates from the disc 132A, and is supported only on one surface side by the disc 135A. Thus, the inner peripheral side tends to deform so as to approach the disc 132A, and the protruding part 159A on the outer peripheral side easily deforms so as to approach the bottom part 165A of the case member 140A.

In the compression stroke at a low piston frequency, a frequency of the deformation of the partition disc 134A accordingly decreases, and hence the oil liquid flows from the lower chamber 20 to the variable chamber 171A in an initial stage of the compression stroke. However, the partition disc 134A is thereafter brought into abutment against the bottom part 165A of the case member 140A and stops thereat, and the oil liquid does not thus flow from the lower chamber 20 to the variable chamber 171A. Therefore, a state in which a flow rate of the oil liquid which is introduced from the lower chamber 20 into the first passage 102A including the passages in the passage holes 39, passes through the damping force generating mechanism 42A, and flows to the upper chamber 19 does not decrease is brought about. Thus, as indicated by the solid line X12 of FIG. 8, the damping force on the compression side becomes hard.

The damping force changing mechanism 43A on the compression side of the second embodiment is configured to define the variable chambers 171A and 172A inside the case member 140A using the elastically deformable annular partition disc 134A provided with the annular seal member 156A configured to seal the gap to the case member main 140A, and the axial length can thus be decreased. Thus, even when both the damping force changing mechanism 43D on the extension side and the damping force changing mechanism 43A on the compression side are provided, the base length of the overall shock absorber 1 can be decreased, thereby decreasing the size.

Moreover, the axial lengths of the damping force changing mechanisms 43A and 43D can be decreased. Thus, even when both the damping force changing mechanism 43D on the extension side and the damping force changing mechanism 43A on the compression side are provided, the respective inner peripheral sides of the piston 18 and the case members 140 and 140A of the damping force changing mechanisms 43A and 43D can be fastened to the piston rod 21 by the general-purpose nut 176 while the piston rod 21 is passed through. Thus, the piston 18 and the damping force changing mechanisms 43A and 43D can easily be fastened to the piston rod 21.

Moreover, the inner peripheral side of the partition disc 134A is not clamped from the both surface sides, and is supported only on the one surface side. Thus, the partition disc 134A easily deforms, and the volumes of the variable chambers 171A and 172A can easily be changed. Thus, responsiveness of the damping force changing mechanism 43A can be improved.

Moreover, the damping force generating mechanism 42A on the compression side also includes the main valve 52A and the pilot chamber 80A. The main valve 52A is configured to suppress the flow of the oil liquid generated by the slide of the piston 18, to thereby generate the damping force. The pilot chamber 80A is configured to apply the pressure in the closing direction to the main valve 52A. The damping force generating mechanism 42A is of the pressure control type of introducing part of the flow of the oil liquid into the pilot chamber 80A, to thereby control the opening of the main valve 52A through the pressure in the pilot chamber 80A. Therefore, even when a range of the change in volume of the damping force changing mechanism 43A is small, as indicated by the solid line X12 and the broken line X21 of FIG. 8, the damping force can be changed from the low speed region of the piston 18 in which the flow of the oil liquid from the lower chamber 20 to the upper chamber 19 has a low flow rate to the high speed region of the piston 18 in which the flow has a high flow rate.

Moreover, the portion of the second passages 181 and 181A formed in the piston rod 21 is formed as the passage grooves 30 and 30A formed in the outer peripheral portion of the mount shaft part 28 of the piston rod 21, and machining can thus be easily performed.

Moreover, the damping force changing mechanism 43D configured to change the damping force in response to the piston frequency in the extension stroke and the damping force changing mechanism 43A configured to change the damping force in response to the piston frequency in the compression stroke are provided. Thus, the comfortability can be further improved.

Third Embodiment

Figure 9:
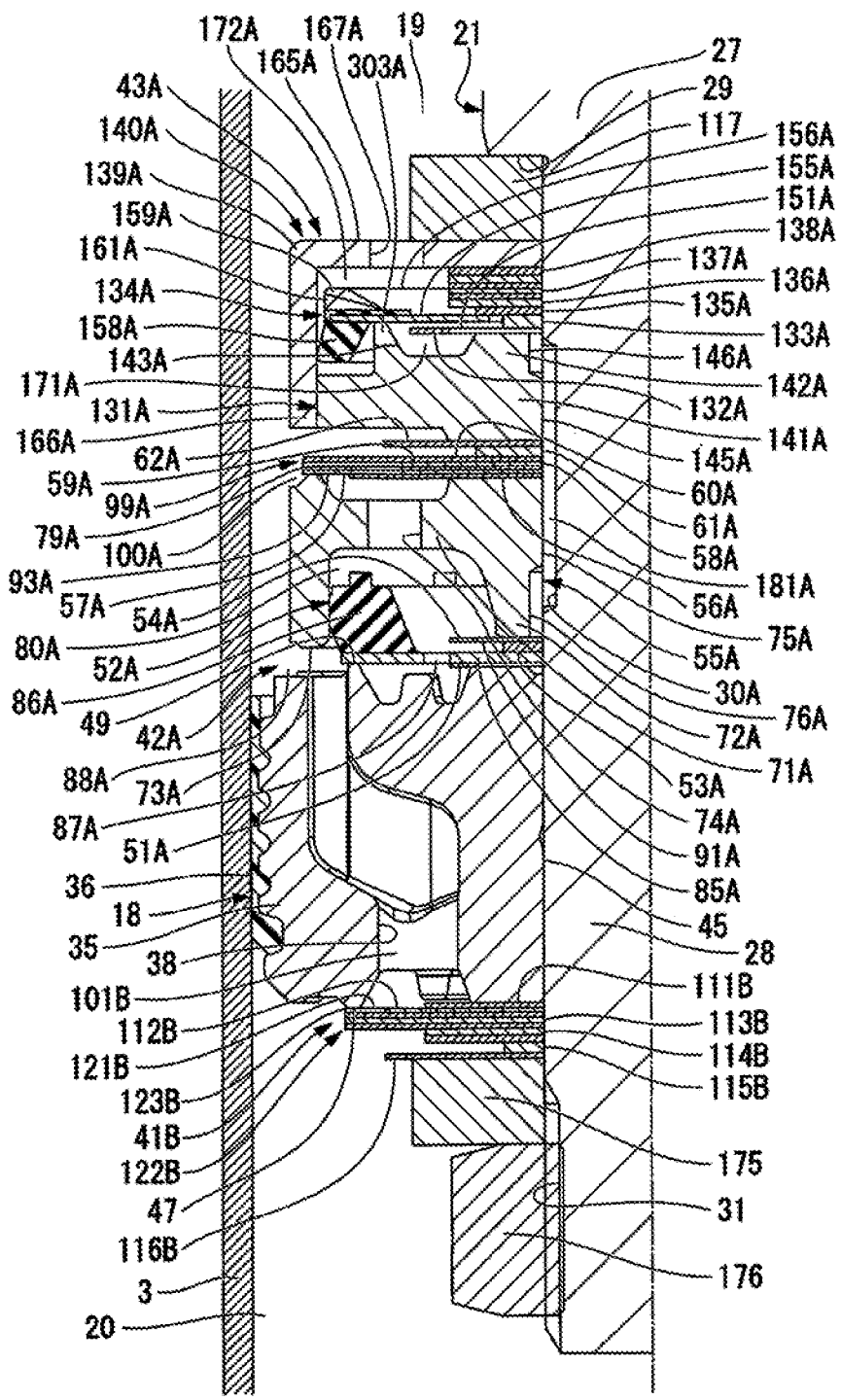
FIG. 9 is a partial sectional view for illustrating the shock absorber according to a third embodiment of the present invention, and is an illustration of a part around the piston, damping force generating mechanisms, and a damping force changing mechanism.
Figure 10:
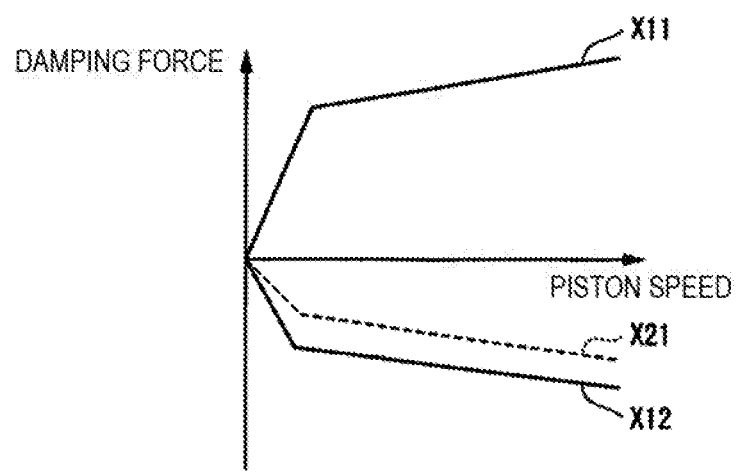
FIG. 10 is a characteristic line diagram for conceptually illustrating the relationship between the damping force and the piston speed of the shock absorber according to the third embodiment of the present invention.

Next, with reference to mainly FIG. 9 and FIG. 10, description is made of a third embodiment mainly in terms of a difference from the first and second embodiments. The same terms and the same reference symbols are given to components which are common to those of the first and second embodiments.

As illustrated in FIG. 9, in the third embodiment, a damping force generating mechanism 41B on the extension side having the same configuration as the damping force generating mechanism 42 on the compression side of the first embodiment is provided in place of the damping force generating mechanism 41D on the extension side of the second embodiment. Moreover, in the third embodiment, the damping force changing mechanism 43D on the extension side of the second embodiment is not provided. In the third embodiment, the damping force generating mechanism 42A on the compression side and the damping force changing mechanism 43A on the compression side of the second embodiment are provided.

In the piston rod 21 of the third embodiment, only the passage groove 30A is provided as the passage groove in the outer peripheral portion of the mount shaft part 28.

The damping force generating mechanism 41B on the extension side is provided for the passage holes 38 on the extension side of the piston 18. The damping force generating mechanism 41B is disposed on the lower chamber 20 side, which is the one end side in the axial direction of the piston 18, and is mounted to the piston rod 21. The damping force generating mechanism 41B includes one disc 111B, one disc 112B, a plurality of discs 113B, a plurality of discs 114B, one disc 115B, and one disc 116B arranged in the stated order from the piston 18 side in the axial direction.

The disc 111B is a common part including the same material and having the same shape as the disc 111, and has an outer diameter smaller than the inner diameter of the valve seat part 47 of the piston 18. The disc 112B is a common part including the same material and having the same shape as the disc 112, has an outer diameter slightly larger than the outer diameter of the valve seat part 47 of the piston 18, and is allowed to seat on the valve seat part 47. A cutout 121B is formed on an outer peripheral side of the disc 112B, and the cutout 121B radially crosses the valve seat part 47.

The plurality of discs 113B are common parts including the same material and having the same shape as the disc 113. The plurality of discs 114B are common parts including the same material and having the same shape as the disc 114. The disc 115B is a common part including the same material and having the same shape as the disc 115. The disc 116B is a common part including the same material and having the same shape as the disc 116.

The discs 112B to 114B form a disc valve 122B which is allowed to separably seat on the valve seat part 47, and separation of the disc valve 122B from the valve seat part 47 causes the passages in the passage holes 38 to open to the lower chamber 20, and suppresses the flow of the oil liquid between the upper chamber 19 and the lower chamber 20. The cutout 121B of the disc 112B serves as a fixed orifice 123B configured to cause the upper chamber 19 and the lower chamber 20 to communicate with each other even when the disc 112B abuts against the valve seat part 47. The annular member 175 is configured to restrict deformation more than a prescribed amount of the disc valve 122B toward an open direction.

The passages in the passage holes 38 on the extension side provided in the piston 18, the fixed orifice 123B, and a gap between the disc valve 122B and the valve seat part 47 during opening form a first passage 101B on the extension side which allows the oil liquid to flow out from the upper chamber 19 toward the lower chamber 20 as a result of the movement of the piston 18 in the extension stroke. The damping force generating mechanism 41B on the extension side is provided in the first passage 101B on the extension side, and is configured to generate the damping force.

On the piston rod 21, there are provided the annular member 117, the case member main body 139A, the plurality of discs 135A, and the disc 133A which are stacked on the shaft step part 29 in the stated order while the mount shaft part 28 is passed through the respective insides. Moreover, the partition disc 134A is stacked on the disc 135A while the disc 133A is passed through the inside. Further, the disc 132A and the lid member 131A are stacked on the disc 133A in the stated order while the mount shaft part 28 is passed through the respective insides. The lid member 131A is fitted to the tubular part 166A of the case member main body 139A.

Further, the disc 62A, the disc 61A, the disc 60A, the disc 59A, the disc 58A, the disc 57A, the disc 56A, the seat member 55A, the disc 54A, the disc 53A, the main valve 52A, the disc 51A, and the piston 18 are stacked on the lid member 131A in the stated order while the mount shaft part 28 is passed through respective insides. Further, the disc 111B, the disc 112B, the plurality of discs 113B, the plurality of discs 114B, the disc 115B, the disc 116B, and the annular member 175 are stacked on the piston 18 in the stated order while the mount shaft part 28 is passed through respective insides.

The nut 176 is threadedly engaged with the male thread 31 of the mount shaft part 28 protruding beyond the annular member 175 in the state in which the parts are arranged in this way. In this state, respective inner peripheral sides or entire portions of the annular member 117, the case member main body 139A, the plurality of discs 135A, the discs 133A and 132A, the lid member 131A, the discs 62A, 61A, 60A, 59A, 58A, 57A, and 56A, the seat member 55A, the discs 54A and 53A, the main valve 52A, the disc 51A, the piston 18, the discs 111B and 112B, the plurality of discs 113B, the plurality of discs 114B, the discs 115B and 116B, and the annular member 175 are sandwiched between the shaft step part 29 of the piston rod 21 and the nut 176, and are thus axially clamped. On this occasion, the inner peripheral side of the partition disc 134A is not axially clamped. In short, the damping force changing mechanism 43A on the compression side, the piston 18, and the damping force generating mechanism 41B on the extension side are fastened to the piston rod 21 by the nut 176 while the piston rod 21 is passed through the respective inner peripheral sides.

In this mounted state to the piston rod 21, as in the second embodiment, the passage in the passage groove 30A of the piston rod 21, the passage in the large-diameter hole part 76A of the seat member 55A of the damping force generating mechanism 42A on the compression side, and the passage in the large-diameter hole part 146A of the lid member 131A of the damping force changing mechanism 43A on the compression side communicate with one another. As a result, the pilot chamber 80A of the damping force generating mechanism 42A on the compression side always communicates with the variable chamber 171A of the damping force changing mechanism 43A on the compression side.

In the third embodiment, the compression stroke in which the piston rod 21 moves toward the compression side operates as in the second embodiment, and the extension stroke in which the piston rod 21 moves toward the extension side is different from the first and second embodiments.

In the extension stroke, the pressure in the upper chamber 19 increases, but the partition disc 134A of the damping force changing mechanism 43A is brought into abutment against the seat part 143A of the lid member 131A, to thereby restrict the extension of the variable chamber 172A, and an amount of the oil liquid introduced from the upper chamber 19 to the variable chamber 172A via the passage in the through hole 167A of the case member 140A is thus suppressed. As a result, a state in which a flow rate of the oil liquid which is introduced from the upper chamber 19 into the passages in the passage holes 38, passes through the damping force generating mechanism 41B, and flows to the lower chamber 20 does not decrease is brought about, and, as indicated by a solid line X11 of FIG. 10, the damping force on the extension side becomes hard.

In the third embodiment, the damping force changing mechanism 43A configured to function in the compression stroke is provided, and a damping force changing mechanism configured to function in the extension stroke is not provided. Thus, the comfortability can be improved effectively for the road surface state and the like by changing the damping force in response to, for example, the piston frequency in the compression stroke while increase in cost is suppressed. Moreover, the posture control is difficult through a shock absorber including a damping force changing mechanism configured to change the damping force in response to the piston frequency in the extension stroke, and it is preferred to effectively use the shock absorber including the damping force changing mechanism 43A configured to change the damping force in response to the piston frequency in the compression stroke for a vehicle to which the posture control is applicable.

Fourth Embodiment

Figure 11:
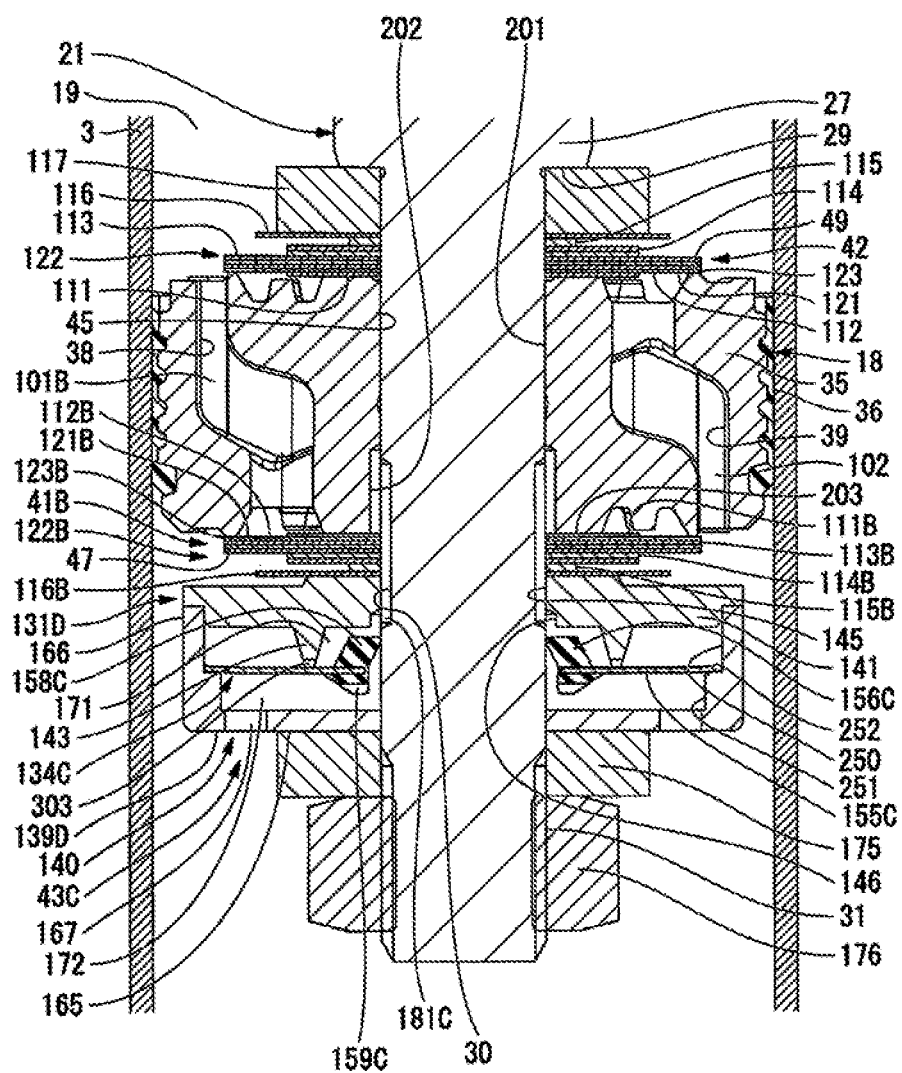
FIG. 11 is a partial sectional view for illustrating the shock absorber according to a fourth embodiment of the present invention, and is an illustration of a part around the piston, the damping force generating mechanisms, and a damping force changing mechanism.
Figure 12:
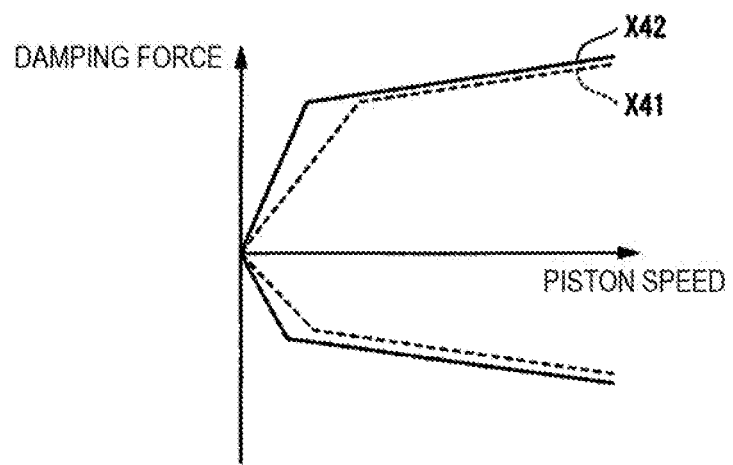
FIG. 12 is a characteristic line diagram for conceptually illustrating the relationship between the damping force and the piston speed of the shock absorber according to the fourth embodiment of the present invention.

Next, with reference to mainly FIG. 11 and FIG. 12, description is made of a fourth embodiment mainly in terms of a difference from the first and third embodiments. The same terms and the same reference symbols are given to components which are common to those of the first and third embodiments.

As illustrated in FIG. 11, in the fourth embodiment, the damping force generating mechanism 42 on the compression side of the first embodiment and the damping force generating mechanism 41B on the extension side of the third embodiment are provided. Moreover, in the fourth embodiment, a damping force changing mechanism 43C partially different from the damping force changing mechanism 43D on the extension side of the second embodiment is provided, and the damping force changing mechanism 43A on the compression side of the third embodiment is not provided.

In the fourth embodiment, the fitting hole 45 of the piston 18 includes a small-diameter hole part 201 and a large-diameter hole part 202. The small-diameter hole part 201 is formed on a valve seat part 49 side in the axial direction, and is configured to fit the mount shaft part 28 of the piston rod 21. The large-diameter hole part 202 is formed on a valve seat part 47 side in the axial direction with respect to the small-diameter hole part 201. Moreover, a cutout 203 is formed on an inner peripheral side in the disc 111B, and the cutout 203 causes a passage in the large-diameter hole part 202 and the passages in the passage holes 38 to communicate with each other.

On the piston rod 21, there are provided the annular member 117, the disc 116, the disc 115, the plurality of discs 114, the plurality of discs 113, the disc 112, the disc 111, and the piston 18 which are stacked on the shaft step part 29 in the stated order while the mount shaft part 28 is passed through the respective insides. Further, the disc 111B, the disc 112B, the plurality of discs 113B, the plurality of discs 114B, the disc 115B, the disc 116B, and the lid member 131D are stacked on the piston 18 in the stated order while the mount shaft part 28 is passed through the respective insides.

Moreover, the cutout 303 is partially formed in a peripheral direction in the seat part 143, thereby causing the inner peripheral side and the outer peripheral side of the seat part 143 to always communicate with each other. A partition disc 134C is provided for the seat part 143. Further, the case member main body 139D and the annular member 175 are provided. The case member main body 139D fits the tubular part 166 to the lid member 131D. Moreover, a step part 252 is formed on an inner peripheral side of the tubular part 166 of the case member main body 139D by providing a larger diameter part 250 and a smaller diameter part 251, thereby supporting an outer diameter side of the disc 155C of the partition disc 134C. An axial dimension between the step part 252 and the seat part 143 is less than a thickness of the disc 155C. As a result, a set load can be applied to the partition disc 134C. A seal main body part 158C and a protruding part 159C of a seal member 156C provided in the partition disc 134C are provided on a piston rod 21 side. A gap between the partition disc 134C and the piston rod 21 is sealed by the annular seal member 156C in this way. Moreover, an annular gap is provided between the partition disc 134C and the mount shaft part 28 serving as a shaft part, and the seal main body part 158C and the protruding part 159C are provided by being fixed to both surfaces of the partition disc 134C. This configuration facilitates the fixation of the seal member formed of the seal main body part 158C and the protruding part 159C to the partition disc 134C.

The nut 176 is threadedly engaged with the male thread 31 of the mount shaft part 28 serving as a shaft part protruding beyond the annular member 175 in the state in which the parts are arranged in this way. With this, respective inner peripheral sides or entire portions of the annular member 117, the disc 116, the disc 115, the plurality of discs 114, the plurality of discs 113, the discs 112 and 111, the piston 18, the discs 111B and 112B, the plurality of discs 113B, the plurality of discs 114B, the disc 115B, the disc 116B, the lid member 131D, the case member main body 139D, and the annular member 175 are sandwiched between the shaft step part 29 of the piston rod 21 and the nut 176, and are thus axially clamped. On this occasion, an inner peripheral side of the partition disc 134C is not axially clamped.

In short, the damping force changing mechanism 42 on the compression side, the piston 18, the damping force generating mechanism 41B on the extension side, and the damping force changing mechanism 43C on the extension side are fastened to the piston rod 21 by the nut 176 while the piston rod 21 is passed through the respective inner peripheral sides.

In this mounted state to the piston rod 21, the passage in the passage groove 30 of the piston rod 21, the passage in the large-diameter hole part 202 of the piston 18, and the passage in the large-diameter hole part 146 of the lid member 131D of the damping force changing mechanism 43 communicate with one another. As a result, the passages in the passage holes 38 on the extension side always communicates with the variable chamber 171 of the damping force changing mechanism 43 via a passage in the cutout 203 of the disc 111B, the passage in the large-diameter hole part 202 of the piston 18, the passage in the passage groove 30 of the piston rod 21, and the passage in the large-diameter hole part 146 of the lid member 131D. The passage in the cutout 203, the passage in the large-diameter hole part 202, the passage in the passage groove 30, the passage in the large-diameter hole part 146, the variable chambers 171 and 172, and the through hole 167 form a second passage 181C on the extension side that branches from the first passage 101B on the extension side, and is disposed in parallel with the first passage 101B after the branch. Thus, the two variable chambers 171 and 172, which are at least a part of the second passage 181C, are defined by the partition disc 134C and are provided in the case member 140. The partition disc 134C is configured to block the flow in the second passage 181C only in the extension stroke. A step part 252 side of the partition disc 134C, which is the supported side of the partition disc 134C, opens, to thereby function as a check valve in the compression stroke.

In the fourth embodiment, in the extension stroke at a low piston speed and a high piston frequency, the pressure in the upper chamber 19 increases, and the oil liquid is introduced from the upper chamber 19 into the variable chamber 171 of the damping force changing mechanism 43 via the passages in the passage holes 38 and a portion of the second passage 181C on a passage hole 38 side with respect to the variable chamber 171. Accordingly, the oil liquid is discharged from the variable chamber 172 of the damping force changing mechanism 43, which is a portion on the lower chamber 20 side of the second passage 181C, into the lower chamber 20 via the passage in the through hole 167 of the case member 140. Accordingly, the partition disc 134C, which has been in contact with the seat part 143 and the step part 252, deforms so that the protruding part 159C approaches the bottom part 165 of the case member main body 139D.

The deformation of the partition disc 134C causes introduction of the oil liquid from the upper chamber 19 into the variable chamber 171, and a flow rate of the oil liquid flowing from the upper chamber 19 to the lower chamber 20 via the first passage 101B thus decreases. As a result, as indicated by a broken line X41 of FIG. 12, the damping force on the extension side becomes soft particularly when the piston speed is low.

On the other hand, in the extension stroke at a low piston speed and at a low piston frequency, a frequency of the deformation of the partition disc 134C accordingly decreases, and hence the oil liquid flows from the upper chamber 19 to the variable chamber 171 in an initial stage of the extension stroke. However, the partition disc 134C is thereafter brought into abutment against the bottom part 165 of the case member main body 139D and stops thereat, and the oil liquid does not thus flow from the upper chamber 19 to the variable chamber 171. Therefore, a state in which the flow rate of the oil liquid which is introduced from the upper chamber 19 into the first passage 101B including the passages in the passage holes 38, passes through the damping force generating mechanism 41B, and flows to the lower chamber 20 does not decrease is brought about. Thus, as indicated by a solid line X42 of FIG. 12, the damping force on the extension side becomes hard also when the piston speed is low.

In the fourth embodiment, the base length of the overall shock absorber 1 can further be decreased, thereby decreasing the size. Moreover, the number of components decreases, and the assembly thus becomes easier. Therefore, both the component cost and the assembly cost can further be decreased.

There may be provided such a configuration that the damping force generating mechanism 42 on the compression side, the damping force generating mechanism 41B on the extension side, and the damping force changing mechanism 43A on the compression side are provided, and the damping force changing mechanism 43 on the extension side is not provided.

Fifth Embodiment

Figure 13:
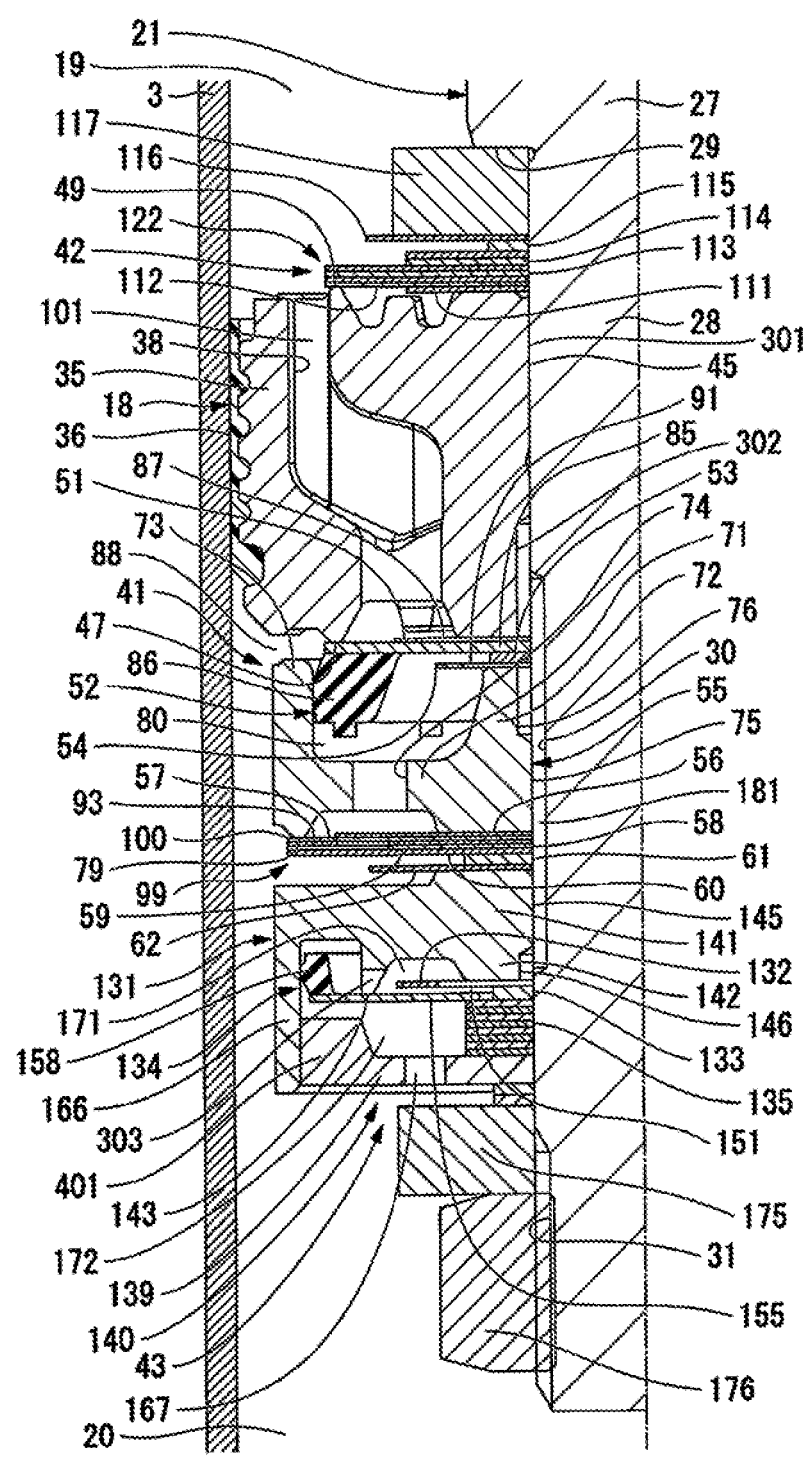
FIG. 13 is a partial sectional view for illustrating the shock absorber according to a fifth embodiment of the present invention, and is an illustration of a part around the piston, the damping force generating mechanisms, and the damping force changing mechanism.

Next, with reference to mainly FIG. 13, description is made of a fifth embodiment mainly in terms of a difference from the first embodiment. The same terms and the same reference symbols are given to components which are common to those of the first embodiment.

As illustrated in FIG. 13, in the fifth embodiment, the seal member 156 of the partition disc 134 includes only the annular seal main body part 158 protruding from the disc 155 toward a side opposite to the lid member 139 in the axial direction, and the protruding part 159 of the first embodiment is not provided. Moreover, an annular protruding part 401 protruding toward the partition disc 134 is integrally formed on an outer peripheral side of the lid member 139. In the fourth embodiment, deformation of the partition disc 134 equal to or more than a predetermined value toward a variable chamber 172 side is restricted through abutment of the protruding part 401.

Sixth Embodiment

Figure 14:
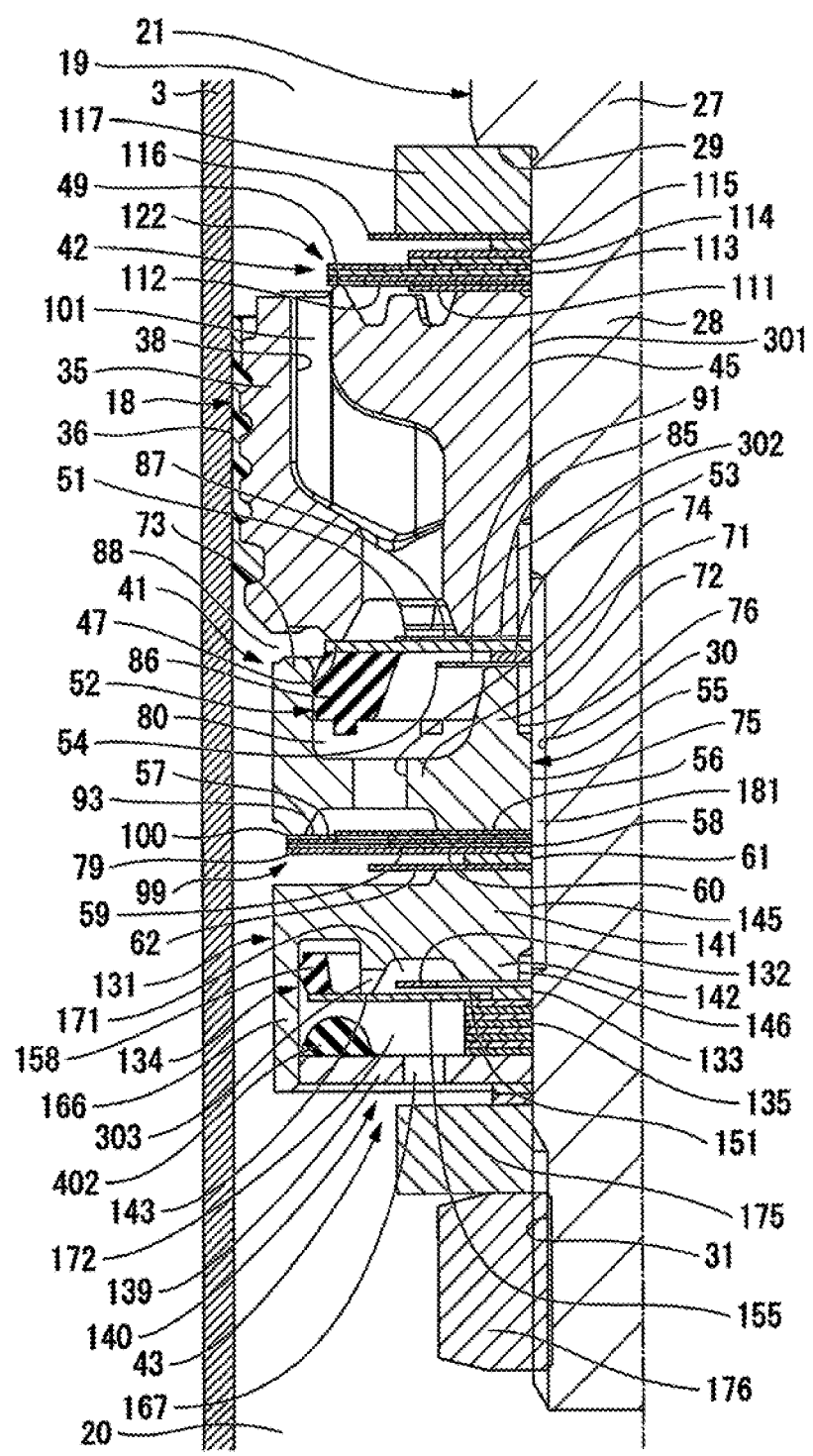
FIG. 14 is a partial sectional view for illustrating the shock absorber according to a sixth embodiment of the present invention, and is an illustration of a part around the piston, the damping force generating mechanisms, and the damping force changing mechanism.

Next, with reference to mainly FIG. 14, description is made of a sixth embodiment mainly in terms of a difference from the fifth embodiment. The same terms and the same reference symbols are given to components which are common to those of the fifth embodiment.

As illustrated in FIG. 14, in the sixth embodiment, an annular rubber stopper 402 protruding toward the partition disc 134 is formed on the outer peripheral side of the lid member 139. In the fourth embodiment, the deformation of the partition disc 134 equal to or more than the predetermined value toward the variable chamber 172 side is restricted through the abutment of the protruding part 401.

In the above-mentioned embodiments, description is made of, as an example, the case in which the inner peripheral side of the partition disc 134 is supported by the disc 135 in the case member 140, the seal member 156 is provided on the outer peripheral side, which is the non-supported side, the inner peripheral side of the partition disc 134A is also supported by the disc 135A in the case member 140A, and the seal member 156A is provided on the outer peripheral side, which is the non-supported side. Conversely, the outer peripheral side of the partition disc 134C is supported in the case member 140, and the annular seal member configured to seal the gap to the case member 140 is provided on the inner peripheral side, which is the non-supported side. The outer peripheral sides of the partition discs 134 and 134A may be supported respectively in the case members 140 and 140A, and annular seal members configured to seal respectively the gaps to the case members 140 and 140A may be provided on the inner peripheral sides, which are the non-supported sides.

In the above-mentioned embodiments, the examples in which the present invention is applied to the hydraulic shock absorber of the twin-tube type are described. However, the shock absorber is not limited to this type. A hydraulic shock absorber of a mono-tube type, in which the outer tube is omitted and a gas chamber is formed by a slidable partition body on a side of the lower chamber 20 opposite to the upper chamber 19 in the cylinder 2, may be used. Thus, the present invention is applicable to any type of shock absorber. As a matter of course, the present invention can be applied to the base valve 25. Moreover, the present invention can be applied to a case where an oil passage communicating with the inside of the cylinder 2 may be provided outside the cylinder 2, and a damping force generating mechanism is provided in the oil passage.

In the above-mentioned embodiments, the hydraulic shock absorber is exemplified, but water or air may be used as the fluid.

In the above-mentioned embodiments, description is made of the various damping force generating mechanisms. However, the combinations are not limited to these examples. For example, the damping force generating mechanism of the first embodiment may be used in the second embodiment.

Seventh Embodiment

Figure 15:
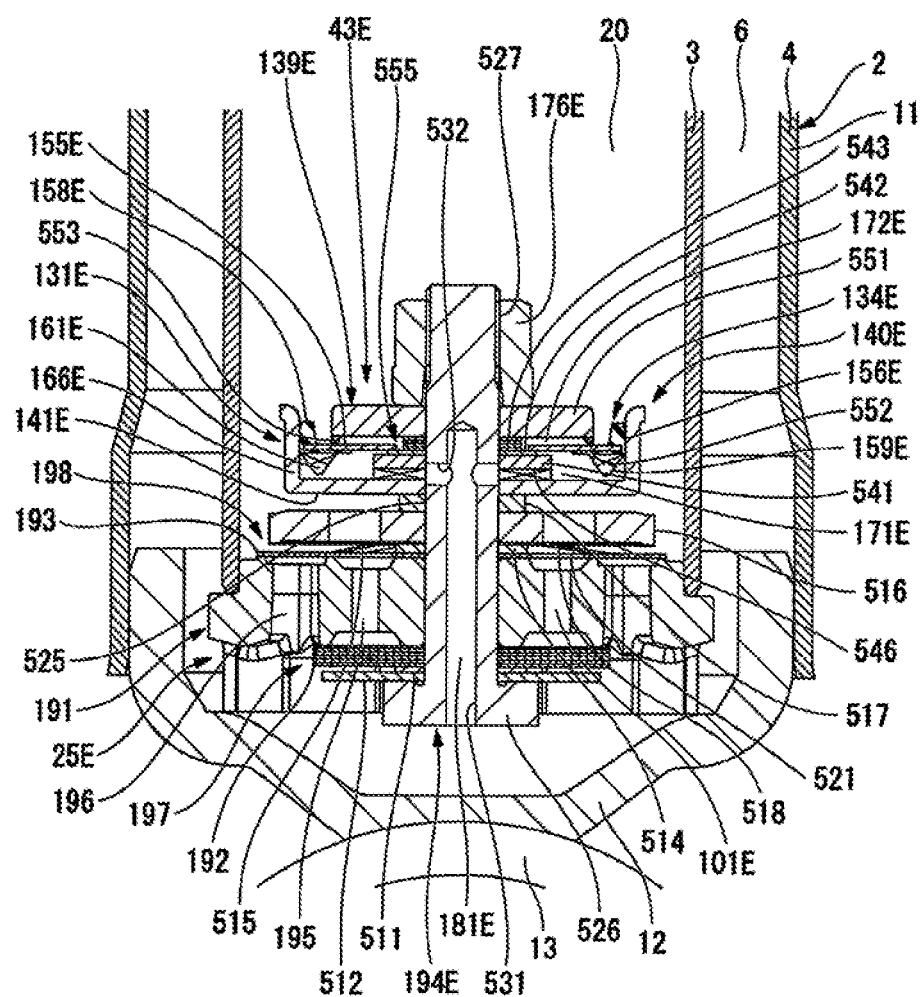
FIG. 15 is a partial sectional view for illustrating the shock absorber according to a seventh embodiment of the present invention, and is an illustration of a part around a base valve and the damping force changing mechanism.

Next, with reference to mainly FIG. 15, description is made of a seventh embodiment mainly in terms of a difference from the first embodiment. The same terms and the same reference symbols are given to components which are common to those of the first embodiment.

As illustrated in FIG. 15, in the seventh embodiment, a damping force changing mechanism 43E is provided in a base valve 25E partially different from the base valve 25. The base valve 25E includes the base valve member 191, the plurality of discs 192, and the one disc 193, which are the same as those of the first embodiment, and includes a mounting pin 194E partially different from the mounting pin 194. The plurality of discs 192 together with the base valve member 191 form the damping valve 197, and the one disc 193 together with the base valve member 191 form a suction valve 198.

The base valve 25E includes a spacer 511 and a restriction disc 512. The spacer 511 is disposed on a side opposite to the base valve member 191 with respect to the plurality of discs 192, and has an outer diameter smaller than the outer diameter of the discs 192. The restriction disc 512 is disposed on a side opposite to the discs 192 with respect to the spacer 511, and has an outer diameter larger than the outer diameter of the spacer 511 and slightly smaller than the outer diameter of the discs 192. Moreover, the base valve 25E includes a spacer 514, a spring member 515, a restriction disc 516, and a spacer 517. The spacer 514 is disposed on a side opposite to the base valve member 191 with respect to the disc 193, and has an outer diameter smaller than the outer diameter of the disc 193. The spring member 515 is disposed on a side opposite to the disc 193 with respect to the spacer 514. The restriction disc 516 is disposed on a side opposite to the spacer 514 with respect to the spring member 515, and has an outer diameter larger than the outer diameter of the spacer 511 and slightly smaller than the outer diameter of the disc 193. The spacer 517 is disposed on a side opposite to the spring member 515 with respect to the restriction disc 516, and has an outer diameter smaller than the outer diameter of the restriction disc 516.

A disc 193 forming the suction valve 198 is brought into abutment against the base valve member 191 to close the passage hole 196, and is separated from the base valve member 191 to open the passage hole 196. The spring member 515 includes a plurality of spring parts 518 extending radially outward, and being inclined so that a portion on the spring member 515 becomes closer to the disc 193 as the portion approaches the radially outer side. The plurality of spring parts 518 press the disc 193 against the base valve member 191 with a small biasing force. A through hole 521 configured to cause the passage hole 195 of the base valve member 191 to always communicate with the lower chamber 20 is formed in the suction valve 198.

The plurality of discs 192 forming the damping valve 197 are brought into abutment against the base valve member 191 to close the passage hole 195, and are separated from the base valve member 191 to open the passage hole 195.

The mounting pin 194E includes a mount shaft part 525 and a flange part 526. The flange part 526 extends radially outward from one end side in the axial direction of the mount shaft part 525. A male thread 527 is formed on an outer peripheral portion of the mount shaft part 525 on a side opposite to the flange part 526 in the axial direction. The mount shaft part 525 has a passage hole 531 and a passage hole 532. The passage hole 531 extends from one end portion on a flange part 526 side in the axial direction to an intermediate position on the other end side at a center of the mount shaft part 525 in the radial direction. The passage hole 532 crosses the passage hole 531, and radially passes through the mount shaft part 525.

The damping force changing mechanism 43E includes one case member main body 131E having a bottomed tubular shape, one passage formation member 541, one disc 542, a plurality of discs 543, one partition disc 134E (disc), and an opposing member 139E opposing the partition disc 134E arranged in the stated order from a base valve 25E side in the axial direction. The case member main body 131E and the opposing member 139E form a case member 140E. The case member main body 131E, the passage formation member 541, the discs 542 and 543, and the opposing member 139E are made of metal. The discs 542 and 543 each have a holed circular flat plate shape having a constant thickness capable of fitting the mount shaft part 525 of the mounting pin 194E to an inside. The passage formation member 541, the case member main body 131E, and the opposing member 139E each have an annular shape capable of fitting the mount shaft part 525 of the mounting pin 194E to an inside.

The opposing member 139E includes a base part 551 having a holed disc shape and an annular protruding part 552 protruding from an outer peripheral portion of the base part 551 toward one side in the axial direction. A plurality of cutouts 553 are formed partially in a circumferential direction in the protruding part 552, and the cutouts 553 radially pass through the protruding part 552.

The case member main body 131E includes a base part 141E having a holed disc shape and a tubular part 166E having a cylindrical shape. The base part 141E extends along a direction orthogonal to the axial direction. The tubular part 166E extends in the axial direction from an outer peripheral edge portion of the base part 141E.

The passage formation member 541 is placed on the baes part 141E of the case member main body 131E. A plurality of radial grooves 546 passing through radially are formed on a base part 141E side in the passage formation member 541. The disc 542 has an outer diameter smaller than the outer diameter of the passage formation member 541. Each of the plurality of discs 543 has an outer diameter smaller than the outer diameter of the disc 542.

The partition disc 134E includes a metal disc 155E and a rubber seal member 156E fixed on an outer peripheral side of the disc 155E, and is elastically deformable. The disc 155E has a holed circular flat plate shape having a constant thickness, can be disposed with a gap to the plurality of discs 543 arranged inside, and has a thickness smaller than a total thickness of the plurality of discs 543. The disc 155E has an outer diameter larger than an outer diameter of the protruding part 552 of the opposing member 139E, and smaller than an inner diameter of the tubular part 166E of the case member main body 131E.

The protruding part 552 of the opposing member 139E protrudes toward the disc 155E of the partition disc 134E, and is brought into abutment against the disc 155E, to thereby restrict further movement of the disc 155E toward the opposing member 139E side. The protruding part 552 supports an outer peripheral side of the partition disc 134E at an end portion on a protruding tip side thereof. Moreover, a radially inner side and a radially outer side of the protruding part 552 always communicate with each other via the cutouts 553.

The seal member 156E is fixed to an outer peripheral side of the disc 155E while forming an annular shape. The seal member 156E includes a seal part 158E having an annular shape and an elastic part 159E having an annular shape. The seal part 158E protrudes from the disc 155E toward an opposing member 139E side in the axial direction. The elastic part 159E protrudes from the disc 155E toward a side opposite to the opposing member 139E in the axial direction. An inner diameter of the seal part 158E at an end portion on a disc 155E side is the minimum inner diameter, and this inner diameter is larger than the outer diameter of the protruding part 552. As a result, the partition disc 134E is configured so that the disc 155E thereof can be brought into abutment against the protruding part 552 of the opposing member 139E. A radial groove 161E opening to a side opposite to the disc 155E, and passing through radially is formed in the elastic part 159E.

The disc 542 has an outer diameter larger than an inner diameter of the disc 155E of the partition disc 134E. As a result, an inner peripheral side of the partition disc 134E is supported so as to be movable in a range of an axial length of an entirety of the plurality of discs 543 between the disc 542 and the opposing member 139E. In other words, the partition disc 134E is provided so as to be movable relative to the case member main body 131E and the opposing member 139E which move integrally with the passage formation member 541 and the discs 542 and 543. Moreover, an annular seal part 158E configured to seal a gap between an outer periphery of the partition disc 134E and an inner periphery of the case member main body 131E is provided on an outer peripheral side, which is a non-supported side, of the partition disc 134E. The seal member 156E including the seal part 158E is brought into contact with the case member main body 131E, to thereby center the seal member 156E with respect to the case member main body 131E. In other words, the inner peripheral side of the partition disc 134E has such a simple support structure that the inner peripheral side is not clamped from both surface sides and is supported only on one surface side by the disc 542. The seal part 158E is provided on a protruding part 552 side in the axial direction in the partition disc 134E, and axially overlaps the protruding part 552.

The opposing member 139E is provided on a side opposite to the base part 141E with respect to the partition disc 134E so as to oppose the partition disc 134E. The opposing member 139E has a holed disc shape capable of fitting the mount shaft part 525 of the mounting pin 194E to an inside. The elastic part 159E is provided on a surface on a side opposite to a surface on which the seal part 158E of the partition disc 134E is provided, and the elastic part 159E is thus provided between the surface on the side opposite to the surface on which the seal part 158E of the partition disc 134E is provided, and the base part 141E of the case member main body 131E.

The seal part 158E of the partition disc 134E is in contact with an inner peripheral surface of the tubular part 166E of the case member main body 131E over an entire circumference, thereby sealing a gap between the partition disc 134E and the tubular part 166E. The seal part 158E always seals the gap between the partition disc 134E and the tubular part 166E even when the partition disc 134E deforms with respect to the case member main body 131E within an allowable range. The partition disc 134E is centered with respect to the case member main body 131E through the contact of the seal part 158E of the partition disc 134E with the tubular part 166E over the entire circumference as described before. The partition disc 134E defines, together with the case member main body 131E, a variable chamber 171E having a variable volume on a base part 141E side in the case member 140E. The partition disc 134E partitions, together with the opposing member 139E, a chamber 172E on a base part 551 side in the case member 140E. A surface of the partition disc 134E on a side opposite to the variable chamber 171E faces the lower chamber 20. The partition disc 134E forms the variable chamber 171E in a gap to the base part 141E of the case member main body 131E. The variable chamber 171E always communicates with the reservoir chamber 6 via the passages in the radial grooves 546 of the passage formation member 541, the passage in the passage hole 532 of the mounting pin 194E, and the passage in the passage hole 531.

In the mounting pin 194E, there are provided the restriction disc 512, the spacer 511, the plurality of discs 192, the base valve member 191, the disc 193, the spacer 514, the spring member 515, the restriction disc 516, the spacer 517, the case member main body 131E, the passage formation member 541, the disc 542, the plurality of discs 543, and the opposing member 139E which are stacked on the flange part 526 in the stated order while the mount shaft part 525 is passed through respective insides. On this occasion, the partition disc 134E is fitted to the inside of the case member main body 131E, and is disposed between the disc 542 and the opposing member 139E. In this state, the passage hole 532 of the mounting pin 194E communicates with the plurality radial grooves 546 of the passage formation member 541.

A nut 176E is threadedly engaged with the male thread 527 of the mount shaft part 525 protruding beyond the opposing member 139E of the mounting pin 194E in the state in which the parts are arranged in this way. In this state, respective inner peripheral sides or entire portions of the restriction disc 512, the spacer 511, the plurality of discs 192, the base valve member 191, the disc 193, the spacer 514, the spring member 515, the restriction disc 516, the spacer 517, the case member main body 131E, the passage formation member 541, the disc 542, the plurality of discs 543, and the opposing member 139E are sandwiched between the flange part 526 of the mounting pin 194E and the nut 176E, and are thus axially clamped. On this occasion, the inner peripheral side of the partition disc 134E is not axially clamped. The nut 176E is a general-purpose hexagonal nut. The mounting pin 194E is inserted through the inner peripheral sides of the case member main body 131E and the opposing member 139E, and fastens the inner peripheral sides of the case member main body 131E and the opposing member 139E.

As a result, in the seventh embodiment, the damping force changing mechanism 43E formed of the case member main body 131E, the passage formation member 541, the discs 542 and 543, the opposing member 139E, and the partition disc 134E is provided in the base valve 25E.

The partition disc 134E is deformable in a range in which an inner peripheral side thereof moves between the disc 542 and the base part 551 of the opposing member 139E, and an outer peripheral side thereof moves between the protruding part 552 and the baes part 141E of the case member main body 131E. On this occasion, the minimum axial distance between the protruding part 552 supporting the outer peripheral side of the disc 155E of the partition disc 134E from the one side in the axial direction and the disc 542 supporting an inner peripheral side of the disc 155E from the other side in the axial direction is less than an axial thickness of the disc 155E. Thus, when the variable chamber 171E and the lower chamber 20 have the same pressure, the disc 155E is in pressure-contact with the protruding part 552 and the disc 542 over an entire circumference in a slightly deformed state due to an elastic force of its own. The partition disc 134E is configured to block flow of the oil liquid between the variable chamber 171E and the chamber 172E, namely the lower chamber 20, in the state in which the inner peripheral side of the partition disc 134E is in contact with the disc 542 over an entire circumference. Moreover, the partition disc 134E is configured to permit the flow of the oil liquid between the variable chamber 171E and the chamber 172E, namely the lower chamber 20, in a state in which the inner peripheral side thereof is separated from the disc 542.

Thus, the inner peripheral side of the partition disc 134E and the disc 542 form a check valve 555 configured to permit flow of the oil liquid from the variable chamber 171E to the lower chamber 20, and restrict flow of the oil liquid from the lower chamber 20 to the variable chamber 171E. The check valve 555 is a free valve in which the entire partition disc 134E, which is a valve body thereof, can axially move.

In the extension stroke, when the pressure in the lower chamber 20 falls below the pressure (atmospheric pressure) of the reservoir chamber 6, this pressure is applied to the partition disc 134E. Then, the inner peripheral side of the disc 155E of the partition disc 134E separates from the disc 542, and the check valve 555 thus opens. As a result, the oil liquid in the reservoir chamber 6 flows to the lower chamber 20 via the passages in the passage holes 531, the passage in the passage hole 532, the passages in the radial grooves 546, the variable chamber 171E, the passage between the disc 155E and the disc 542 of the open check valve 555, the chamber 172E between the base part 551 of the opposing member 139E and the disc 155E, and the passage in the cutout 553.

The variable chamber 171E and the reservoir chamber 6 communicate with each other via the passages in the radial grooves 546, the passage in the passage hole 532, and the passages in the passage holes 531. Thus, when the pressure in the lower chamber 20 exceeds the pressure in the reservoir chamber 6 in the compression stroke at a high frequency, for example, impact shock or the like, the partition disc 134E deforms toward a base part 141E side, to thereby decrease the volume of the variable chamber 171E while causing the oil liquid in the variable chamber 171E to flow to the reservoir chamber 6. Then, the volume of the lower chamber 20 increases accordingly. As a result, the damping force becomes soft.

With the seventh embodiment, the damping force changing mechanism 43E including the case member main body 131E is integrally provided in the base valve 25E, and the axial length of the assembly integrally assembled including the piston 18 and the piston rod 21 can further be decreased.

The elastic part 159E is provided between the side opposite to the surface on which the seal part 158E of the partition disc 134E is provided and the base part 141E of the case member main body 131E, and noise caused by a contact of the partition disc 134E with the base part 141E of the case member main body 131E can thus be suppressed. Moreover, the deformation of the partition disc 134E is facilitated through the elastic deformation of the elastic part 159E, and a variable frequency characteristic becomes smooth.

In this way, the reservoir chamber 6 configured to compensate the entry and the exit of the piston rod 21 is provided in the cylinder 2, and the first passage 101E inside the passage hole 195 and the second passage 181E formed of the insides of the passage holes 531 and 532, the insides of the radial grooves 546, the variable chamber 171E, and the chamber 172E are provided between the lower chamber 20, which is the one chamber in the cylinder 2, and the reservoir chamber 6.

In the embodiments described above, the shock absorber includes: a cylinder sealingly enclosing working fluid; a piston slidably fitted in the cylinder, and partitioning an inside of the cylinder into two chambers; a piston rod including one end side coupled to the piston and an opposite end side extending to an outside of the cylinder; a first passage allowing the working fluid to flow out from one of the chambers in the cylinder as a result of movement of the piston; a second passage provided in parallel with the first passage; a damping force generating mechanism provided in the first passage, and configured to generate a damping force; a tubular case member including at least a part of the second passage formed therein; and a shaft part disposed in the case member; a flexible annular disc disposed in the case member while being passed through by the shaft part, supported on an inner peripheral side or an outer peripheral side. An annular elastic seal member configured to seal a gap to the case member or a gap to the shaft part is provided on a non-supported side of the shaft part. The shock absorber further includes two chambers in the case member which are defined and provided by the disc. The disc is configured to block flow toward at least one of the second passage. With this configuration, the two chambers are defined inside the case member by the annular disc provided with the annular seal member configured to seal the gap to the case member, the axial length can thus be decreased, and the overall base length can be decreased, thereby decreasing the size.

Moreover, the inner peripheral sides of the piston and the case member are fastened to the piston rod by the nut while the piston rod is passed through. Thus, the ease of assembly property can be improved.

Moreover, the inner peripheral side of the disc is not clamped from both surface sides, but supported only on one surface side. The disc thus easily deforms, and the volumes of the two chambers can easily be changed.

Moreover, the damping force generating mechanism includes the main valve configured to suppress the flow of the working fluid generated by the slide of the piston to generate the damping force, and the pilot chamber configured to apply the pressure in the closing direction to the main valve. The damping force generating mechanism is configured to introduce part of the flow of the working fluid into the pilot chamber to control opening of the main valve through the pressure in the pilot chamber. With this configuration, the damping force can be changed from the low speed region to the high speed region of the piston.

Moreover, the shock absorber includes: the cylinder sealingly enclosing the working fluid; the piston slidably fitted in the cylinder, and partitioning the inside of the cylinder into the two chambers; the piston rod coupled to the piston, and extending to the outside of the cylinder; the first passage allowing the working fluid to flow out from one of the chambers in the cylinder as a result of the movement of the piston; the second passage provided in parallel with the first passage; the damping force generating mechanism provided in the first passage, and configured to generate the damping force; the tubular case member including at least a part of the second passage formed therein; and the annular disc supported on the inner peripheral side or the outer peripheral side in the case member. The annular seal member configured to seal the gap to the case member is provided on the non-supported side of the annular disc. The shock absorber further includes the two chambers in the case member which are defined and provided by the disc. The disc is a check valve configured to block the flow in the second passage only in the extension stroke, and permit the flow in the compression stroke.

Further, the shaft part is the one end side of the piston rod.

Further, the cylinder includes a reservoir chamber configured to compensate entry and exit of the piston rod, and the first passage and the second passage are provided between one of the chambers in the cylinder and the reservoir chamber.

Further, an annular gap is provided between the disc and the case member or the shaft part, and the elastic seal member is provided by being fixed to both surfaces of the disc via the gap.

Further, the disc is configured to block the flow to the one side of the second passage, and permit the flow to the other side of the second passage.

Further, the flow to the other side is permitted via the supported side of the disc.

Further, a seal position of the seal member is provided on an upstream side of the disc upon the flow to the one side.

Eighth Embodiment

Next, with reference to mainly FIG. 16 to FIG. 19, description is made of an eighth embodiment mainly in terms of a difference from the first and third embodiments. The same terms and the same reference symbols are given to components which are common to those of the first and third embodiments.

Figure 16:
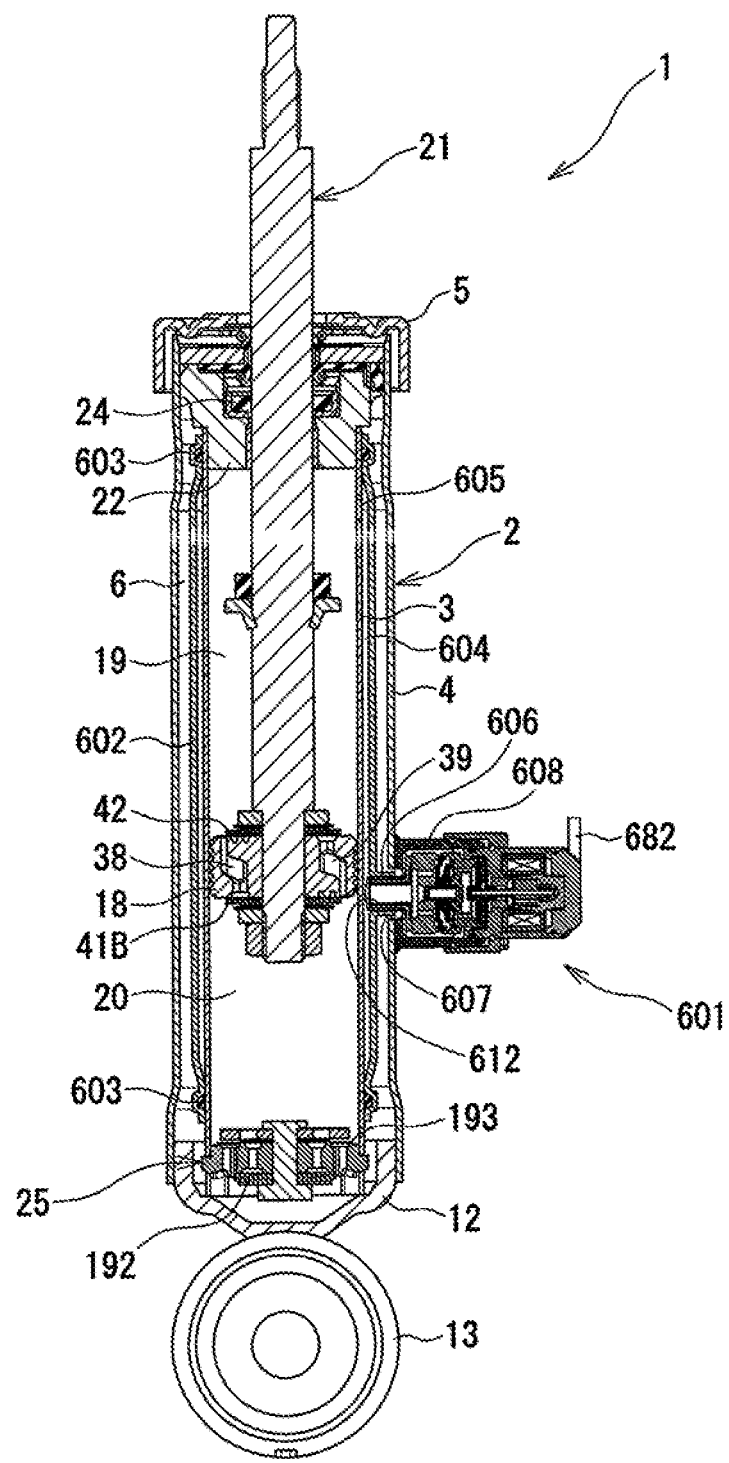
FIG. 16 is a sectional view for illustrating the shock absorber according to an eighth embodiment of the present invention.

As illustrated in FIG. 16, in the eighth embodiment, the damping force generating mechanism 42 on the compression side of the first embodiment and the damping force generating mechanism 41B on the extension side of the third embodiment are provided on the piston 18. Moreover, in the eighth embodiment, a damping force generating mechanism 601 different from that of the first and third embodiments is provided.

As illustrated in FIG. 16, a separator tube 602 is fitted over the inner tube 3 via seal members 603 in both end portions in the axial direction. An annular passage 604 is formed between the separator tube 602 and the inner tube 3. The annular passage 604 communicates with the upper chamber 19 in the inner tube 3 via a passage 605 provided in the vicinity of the top end of the inner tube 3. A cylindrical branch pipe 606 protruding in a radial direction of the separator tube 602 is formed in a lower portion of the separator tube 602. An opening 607 having a diameter larger than an outer diameter of the branch pipe 606 is formed in the outer tube 4 so as to be coaxial with the branch pipe 606. Moreover, a cylindrical valve case 608 is joined through, for example, welding, to the outer tube 4 so as to surround the opening 607. The valve case 608 serves as a tubular case for the damping force generating mechanism 601.

The damping force generating mechanism 601 is provided in a flow passage between the annular passage 604 and the reservoir chamber 6, and is configured to control the flow of the oil liquid flowing from the annular passage 604 to the reservoir chamber 6 through a main valve 611, to thereby generate a damping force. Moreover, the damping force generating mechanism 601 is configured to adjust an opening pressure (set load) of the main valve 611 through a solenoid 610, to thereby change the damping force to be generated. For example, a servomotor or the like may be applied as the solenoid 610 serving as an actuator.

Figure 17:
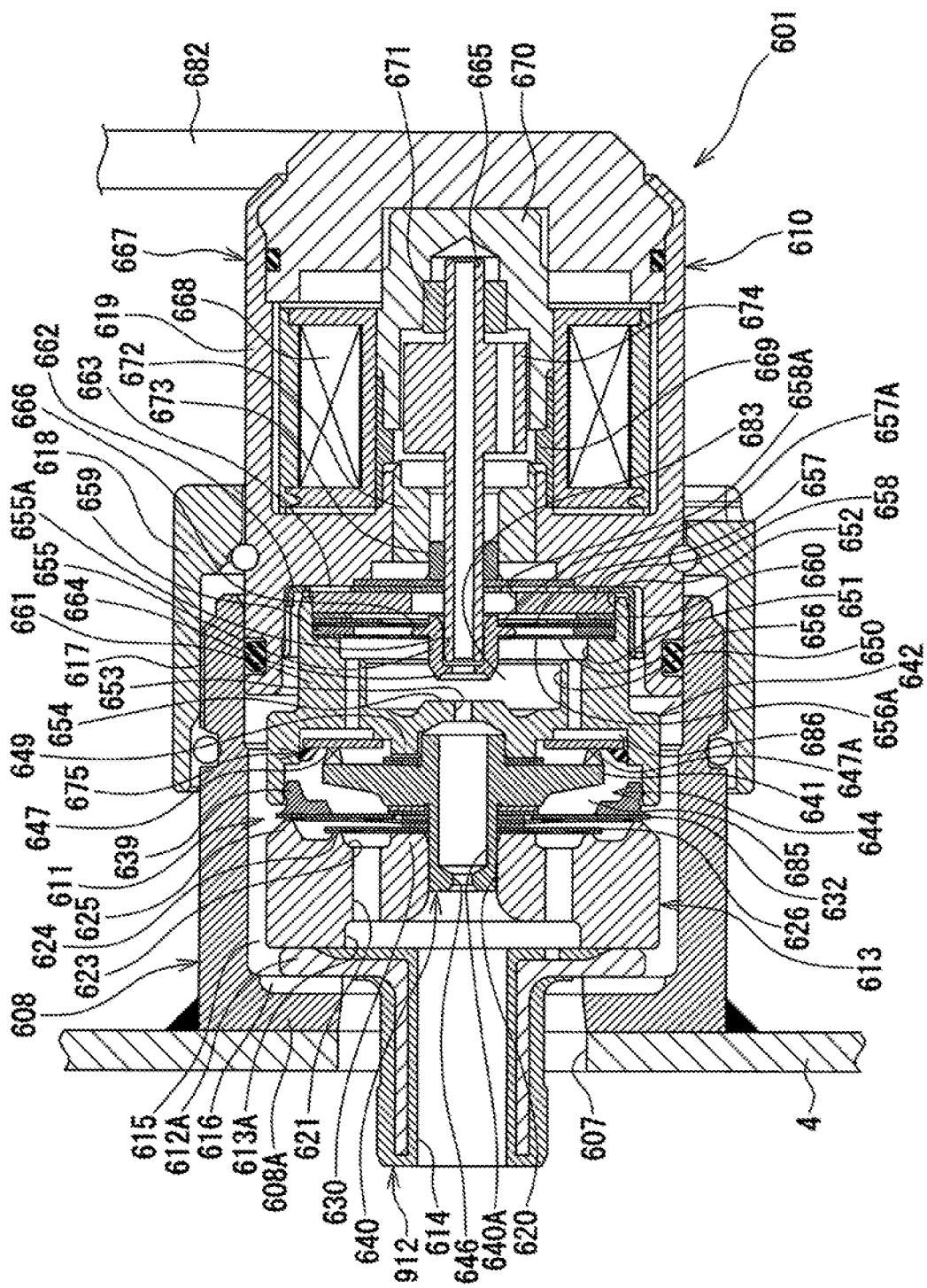
FIG. 17 is a partial sectional view for illustrating the shock absorber according to the eighth embodiment of the present invention, and is an illustration of a part around a damping force generating mechanism, in particular, under a state in which a control current for a solenoid is 0 (upon occurrence of a failure).

As illustrated in FIG. 17, the damping force generating mechanism 601 includes a passage member 612 having a tip portion fixed to the branch pipe 606 of the separator tube 602 (see FIG. 16). On this occasion, the left side in FIG. 17 corresponds to the top side in FIG. 16. The passage member 612 includes an outer flange part 612A which is brought into abutment against an inner flange part 608A (a bottom surface of the valve case 608) of the valve case 608. The main valve 611 includes a valve member 613. The valve member 613 has an approximately cylindrical shape, and has one end surface which is brought into abutment against (close contact with) an outer peripheral edge portion of the outer flange part 612A. The passage member 612 forms a passage 614 that opens in the annular passage 604 (see FIG. 16) at an upstream side end, and opens in a recessed part 613A formed at a center on one end surface of the valve member 613 at a downstream side end.

An annular passage 615 communicating with the reservoir chamber 6 is formed between the valve case 608 and the main valve 611. Moreover, the inner flange part 608A of the valve case 608 has a plurality of passages 616 which extend in the radial direction to cause the passage 615 and the annular passage 604 to communicate with each other. A thread part 617 is formed on an outer peripheral surface in an end portion on an open side of the valve case 608, and the valve case 608 and a solenoid case 619 are coupled to each other by tightening a nut 618 threadedly engaged with the thread part 617.

As illustrated in FIG. 17, the valve member 613 includes a plurality of passages 621 evenly distributed about a shaft hole 620. Each of the passages 621 opens in the recessed part 613A at one end, and opens in an inner annular recessed part 622 formed on the other end surface of the valve member 613 at the other end. With this configuration, the annular recessed part 622 communicates with the annular passage 604 (see FIG. 16) via the passages 621 and the passage 614 of the passage member 612. Moreover, an annular recessed part 623 formed outside the annular recessed part 622 is provided on the other end surface of the valve member 613. An annular valve seat part 624 is formed between the inner annular recessed part 622 and the outer annular recessed part 623. Further, an annular valve seat part 625 is formed outside the annular recessed part 623. A height of the valve seat part 625 in the axial direction with respect to a bottom surface of the annular recessed part 623 as a reference is set to be higher than the height of the valve seat part 624.

Figure 18:
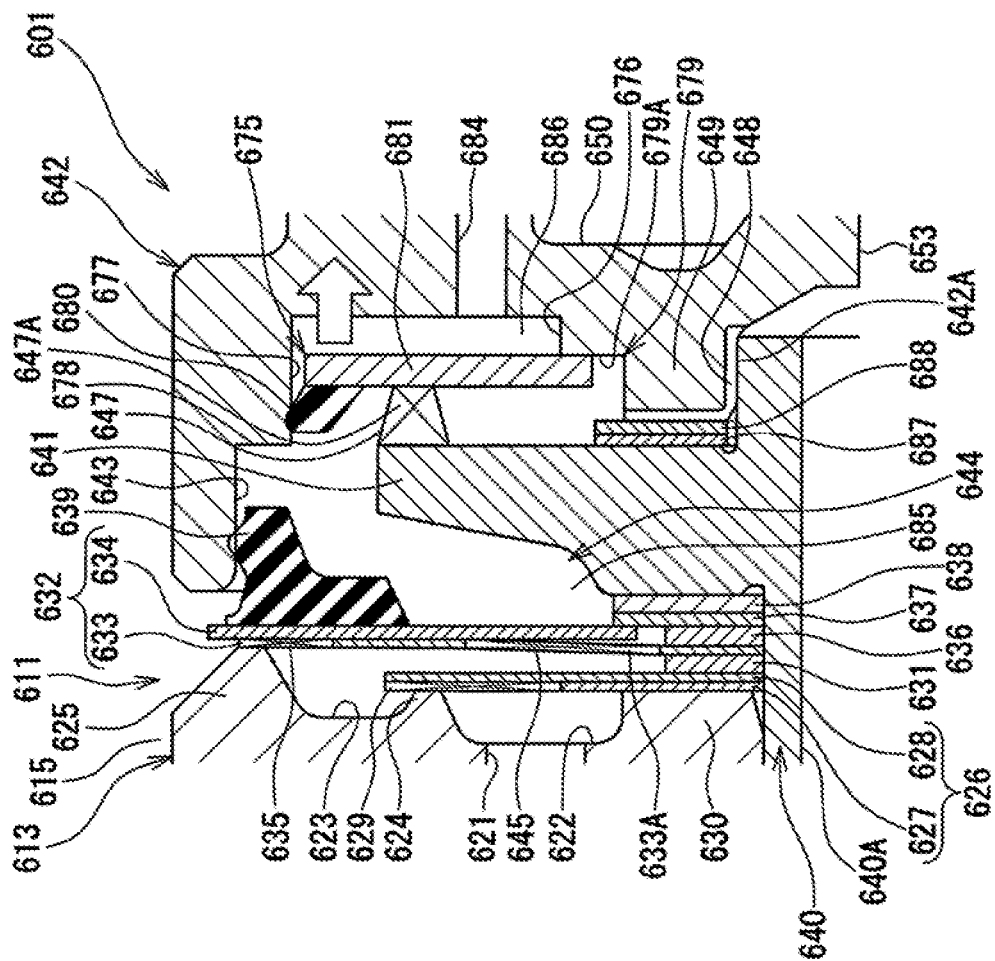
FIG. 18 is a partial sectional view for illustrating the shock absorber according to the eighth embodiment of the present invention, and is an illustration of a part around a damping force changing mechanism.
Figure 19:
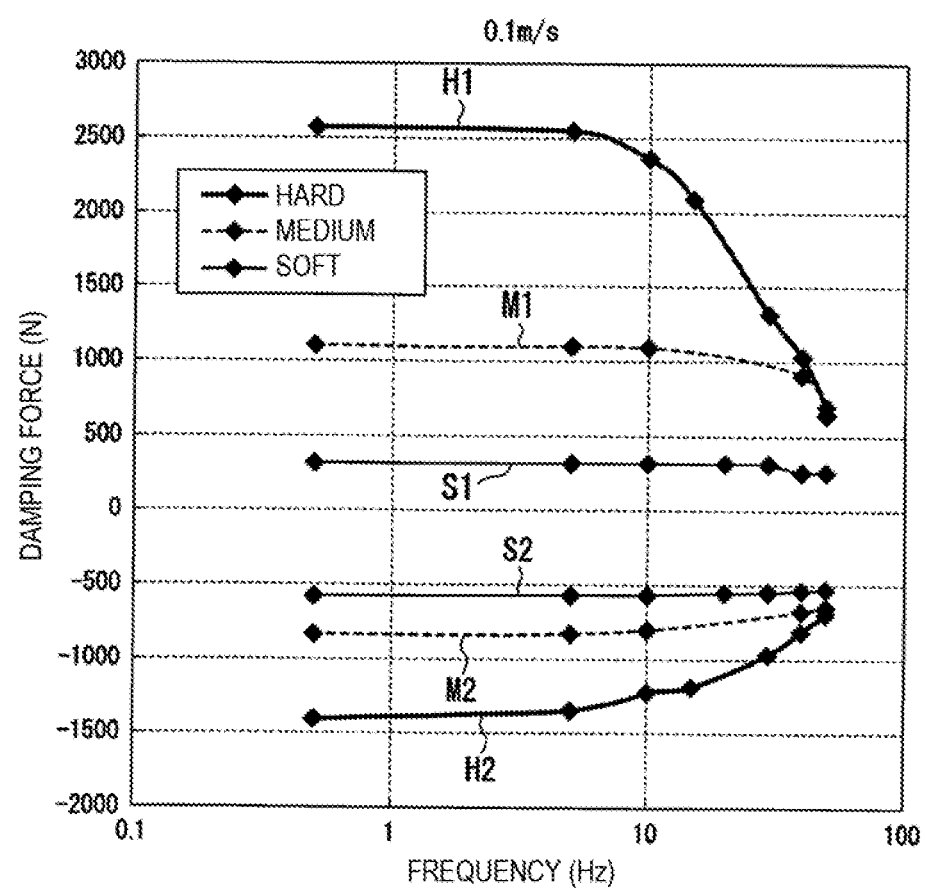
FIG. 19 is a characteristic line diagram for conceptually illustrating the relationship between the damping force and the piston speed of the shock absorber according to the eighth embodiment of the present invention.

As illustrated in FIG. 18, an outer peripheral edge portion of a disc valve 626 is seated on the inner valve seat part 624. FIG. 18 is an enlarged view for illustrating a part of FIG. 17. The disc valve 626 includes a disc 627 and a disc 628 arranged in the stated order from a valve member 613 side in the axial direction. An orifice passage 629 configured to cause the oil liquid introduced into the inner annular recessed part 622 via the passages 621 toward the outer annular recessed part 623 side is formed in the disc 627. Moreover, an inner peripheral edge portion of the disc valve 626 is sandwiched between a shaft part 630 of the valve member 613 and a spacer 631.

On the other hand, the main valve 611 includes a disc valve 632 seated on the outer valve seat part 625. The disc valve 632 includes a disc 633 and a disc 634 arranged in the stated order from a valve member 613 side in the axial direction. An orifice passage 635 configured to cause the oil liquid to flow from the passages 621 to the passage 615 via the disc valve 626 is formed in the disc 633. An inner peripheral edge portion of the disc 633 is sandwiched between the spacer 631 and a spacer 636. A spacer 637 and a spacer 638 are provided in the stated order from a spacer 636 side in the axial direction between the spacer 636 and an inner peripheral edge portion of a flange part 641 of a pilot pin 640. Moreover, outer diameters of the spacer 637 and the spacer 638 are set to be larger than outer diameters of the spacer 631 and the spacer 636.

The disc valve 632 is a so-called packing valve, and an annular packing 639 extending along an outer periphery of the disc 634 is fixed to a rear surface of the disc valve 632. A pilot chamber 644 of the main valve 611 is formed by slidably bringing the packing 639 into abutment against an annular valve seat surface 643 formed on a pilot body 642 (housing) in the valve case 608, to thereby close the opening of the pilot body 642. The disc 634 has an outer diameter larger than an outer diameter of the disc 633, and an inner diameter larger than the outer diameter of the spacer 636 and smaller than the outer diameter of the spacer 637. Moreover, a plate thickness of the disc 634 is set to be thinner than a plate thickness of the spacer 636.

A surface of the disc 634 opposite to the side to which the packing 639 is fixed abuts against the disc 633, and an inner peripheral edge portion of the surface to which the packing is fixed abuts against an outer peripheral edge portion of the spacer 637. That is, the disc 634 has such a simple support structure that the inner peripheral edge portion is not clamped from the both surface sides, and is supported only on the one surface of the inner peripheral edge portion by the spacer 637. Moreover, the disc 634 is centered by causing the packing 639 to be brought into abutment against the valve seat surface 643 of the pilot body 642. An inclined part 633A having a disc spring shape is formed in the disc 633 between an inner peripheral edge portion sandwiched by the spacers 637 and 636, and a portion on an outer peripheral side abutting against the spacer 634. Moreover, an orifice passage 645 is formed in the inclined part 633A of the disc 633.

As illustrated in FIG. 17, the pilot pin 640 includes a shaft hole 640A, an orifice passage 646, and a flange part 641. The orifice passage 646 is formed at an end portion on an upstream side of the shaft hole 640A. The flange part 641 extends in the radial direction toward the valve seat surface 643 of the pilot body 642. Moreover, the pilot pin 640 is fitted in the shaft hole 620 of the valve member 613 at the end portion on the upstream side, and fitted in a shaft hole 642A of the pilot body 642 at an end portion on a downstream side. Further, the pilot pin 640 includes an annular valve seat part 647 formed on an outer peripheral edge portion of a surface (surface on an opposite side with respect to the valve member 613 side) on a pilot body 642 side of the flange part 641.

As illustrated in FIG. 18, a plurality of passages 647A extending in the radial direction across the valve seat part 647 are formed in the valve seat part 647 of the pilot pin 640. Moreover, a passage 648 configured to cause the shaft hole 640A of the pilot pin 640 to communicate with the pilot chamber 644 (variable chamber 685) via the plurality of passages 647A is provided in the pilot body 642. Further, a spacer 687 and a spacer 688 are provided in the stated order from a flange part 641 side in the axial direction between the inner peripheral edge portion of the flange part 641 of the pilot pin 640 and the shaft part 649 of the pilot body 642.

As illustrated in FIG. 17, the pilot body 642 (housing) includes an annular stepped recessed portion provided on a side opposite to a pilot pin 640 side. The stepped recessed portion has an inner diameter stepwisely increasing from the pilot pin 640 side in the axial direction, and includes a first recessed part 650, a second recessed part 651, and a third recessed part 652. A passage 653 configured to cause the stepped recessed portion of the pilot body 642 and the shaft hole 640A of the pilot pin 640 to communicate with each other is provided at a center of the first recessed part 650, namely a center of a bottom portion of the stepped recessed portion.

A valve seat 654 on which a pilot valve 655 (control valve) is seated is provided so as to surround an opening of the passage 653 on a bottom surface (end surface of the shaft part 649 of the pilot body 642) of the first recessed part 650. The pilot valve 655 is provided in a passage configured to cause a pilot passage, namely a variable chamber 686 (housing inner chamber) of the pilot chamber 644 to communicate with the passage 615 (on a downstream side of the main valve 611) inside the valve case 608 via passages 684 of the pilot body 642, a chamber 683 of the pilot body 642, a passage 656A of a return spring 656, a passage 657A (shaft hole) of a disc valve 657, a passage 658A of a holding plate 658, and passages 663 of a cap 662.

In the third recessed part 652 of the pilot body 642, the return spring 656 configured to bias the pilot valve 655 toward a direction away from the valve seat 654 of the pilot body 642, the disc valve 657 configured to function as a failsafe disc valve in a non-current supply state of the solenoid 610, and the holding plate 658 in which the passage 658A is formed are provided in the stated order from the first recessed part 650 side in the axial direction. A spacer 659 is provided between an outer peripheral edge portion of the return spring 656 and an outer peripheral edge portion of the disc valve 657. A spacer 660 is provided between the outer peripheral edge portion of the disc valve 657 and the holding plate 658. Moreover, the cap 662 is placed over one end of a smaller diameter part 661 of the pilot body 642 on which the third recessed part 652 opens. The plurality of passages 663 configured to cause the oil liquid flowing into a solenoid 610 side via the passage 658A of the holding plate 658 to flow toward a passage 615 side are provided in the cap 662.

The pilot valve 655 has a generally cylindrical bottomed shape, and a valve seat part 664 seated on the valve seat 654 of the pilot body 642 is formed on an outer peripheral edge of a bottom portion having a tapered shape. Moreover, one end of an action pin 665 of the solenoid 610 is fitted in a shaft hole 655A of the pilot valve 655. Further, the pilot valve 655 includes a flange part 666 configured to receive an inner peripheral edge portion of the return spring 656. The flange part 666 is brought into abutment against the disc valve 657 in a non-current supply state of the solenoid 610, that is, when the pilot valve 655 is most separated from the valve seat 654, to thereby function as a valve seat part of the fail valve.

As illustrated in FIG. 17, the solenoid 610 includes the solenoid case 619 and a coil case 667. The coil case 667 is formed into a cylindrical shape by molding a coil 668 and a core 669. A cable 682 for supplying a control current to the coil 668 is connected to the coil case 667. The action pin 665 is supported by a bush 671 built in a stator core 670 and a bush 673 built in a core 672 so as to be movable in the axial direction. A plunger 674 (moving core) is fixed to an outer peripheral surface of the action pin 665. The solenoid 610 is configured to generate a thrust when a current is supplied to the coil 668, and the plunger 674 is consequently attracted by the core 672.

On the other hand, the damping force generating mechanism 601 includes a free valve 675 configured to change a damping force in accordance with the piston frequency even when the piston speed is the same. As illustrated in FIG. 18, the free valve 675 is received in an annular recessed part 676 formed in the pilot body 642. The annular recessed part 676 includes a valve seat surface 677 having a radius smaller than a radius of the valve seat surface 643. The valve seat surface 677 continues to the valve seat surface 643 via an annular surface 678. A step part 679 including an annular surface 679A is formed on an inner peripheral side (shaft part 649 side) of the annular recessed part 676.

The free valve 675 is a so-called packing valve, and includes a disc 681 (disc) integrally provided by fixing a packing 680 (seal member) to a surface on a pilot chamber 644 side of an outer peripheral edge portion. The disc 681 is centered by causing the packing 680 to be slidably brought into abutment against the valve seat surface 677 of the annular recessed part 676 over an entire circumference. A surface of the disc 681 opposite to the side to which the packing 680 abuts against the annular surface 679A of the step part 679. That is, the disc 681 has such a simple support structure that an inner peripheral edge portion is not clamped from both surface sides, and is supported only on one surface of the inner peripheral edge portion by the annular surface 679A.

A portion of the disc 681 separated by a predetermined distance from a center of a surface on the side to which the packing 680 is fixed is seated on the valve seat part 647 of the pilot pin 640. Moreover, the disc 681 partitions the pilot chamber 644 into the variable chamber 685 on a main valve 611 side and the variable chamber 686 (housing inner chamber) on an annular recessed part 676 side. The plurality of passages 684 configured to cause the variable chamber 686 and the chamber 683 on a stepped recessed portion side (solenoid 610 side) to communicate with each other are provided in the pilot body 642.

In the damping force generating mechanism 601 in the eighth embodiment, in the extension stroke of the piston rod 21, a disc valve (hereinafter referred to as "disc valve 42") forming the damping force generating mechanism 42 of the piston 18 closes as a result of the movement of the piston 18 in the inner tube 3, and the oil liquid (working fluid) on the upper chamber 19 side is pressurized before opening of a disc valve (hereinafter referred to as "disc valve 41B") forming the damping force generating mechanism 41B of the piston 18. The pressurized oil liquid passes through the passage 605 and the annular passage 604, and flows from the branch tube 606 of the separator tube 602 into the passage member 612 of the damping force generating mechanism 601. On this occasion, an amount of the oil liquid corresponding to the movement of the piston 18 flows from the reservoir chamber 6, opens the disc 193 of the base valve 25, and flows into the lower chamber 20. When the pressure in the upper chamber 19 reaches an opening pressure of the disc valve 41B of the piston 18, the disc valve 41B opens to relieve the pressure in the upper chamber 19 to the lower chamber 20, to thereby prevent the pressure in the upper chamber 19 from excessively increasing.

On the other hand, in the compression stroke of the piston rod 21, the disc valve 42 opens as a result of the movement of the piston 18 in the inner tube 3, and the disc 193 of the base valve 25 opens. Then, before the disc valve 192 opens, the oil liquid in the lower chamber 20 flows into the upper chamber 19 via the passage holes 39, and the oil liquid corresponding to a volume of entry of the piston rod 21 into the inner tube 3 flows from the upper chamber 19 to the reservoir chamber 6 via the same path as in the extension stroke. When the pressure in the lower chamber 20 reaches an opening pressure of the disc valve 192 of the base valve 25, the disc valve 192 opens, to thereby relieve the pressure in the lower chamber 20 to the reservoir chamber 6. As a result, excessive increase in pressure in the lower chamber 20 can be prevented.

On the other hand, in the damping force generating mechanism 610, the oil liquid flowing from the annular passage 604 into the passage 614 of the passage member 612 is introduced into the variable chamber 685 of the pilot chamber 644 via an introduction passage, namely the orifice passage 646 of the pilot pin 640, the shaft hole 640A of the pilot pin 640, the passage 648 of the pilot body 642, and the passage 647A of the valve seat part 647. On this occasion, before the main valve 611 and the pilot valve 655 open, the oil liquid flowing through the passage 614 flows to the reservoir chamber 6 via the passage 621 of the valve member 613, the inner annular recessed part 622, the orifice passage 629 of the disc valve 626, the outer annular recessed part 623, the orifice passage 635 of the disc valve 632, and the passage 615 inside the valve case 608. As a result, a damping force in accordance with the orifice characteristic (damping force is approximately proportional to the square of the piston speed) is generated.

When the pressure in the passage 653 reaches an opening pressure of the pilot valve 655, the pilot valve 655 opens, and the oil liquid flowing into the passage 614 of the passage member 612 flows to the reservoir chamber 6 via the passage 653, the passage 656A of the return spring 656, the passage 657A (shaft hole) of the disc valve 657, the passage 658A of the holding plate 658, the passages 663 of the cap 662, and the passage 615 inside the valve case 608. On this occasion, when the control current to the coil 668 is decreased, thereby decreasing the thrust of the plunger 674, the opening pressure of the pilot valve 655 decreases, and a damping force on a soft side is generated. On the other hand, when the control current to the coil 668 is increased, to thereby increase the thrust of the plunger 674, the opening pressure of the pilot valve 655 increases, and a damping force on a hard side is generated.

When the pressure in the passage 614 of the passage member 612 increases as a result of increase in piston speed, the pressure is transmitted to the outer annular recessed part 623 via the passage 621 of the valve member 613, the inner annular recessed part 622, and the orifice passage 629 of the disc valve 626. Then, when the pressure in the annular recessed part 623 reaches the opening pressure of the disc valve 632, the disc valve 632 separates from the valve seat part 625, and thus opens. As a result, the oil liquid flows to the reservoir chamber 6 via the gap between the open disc valve 632 and the valve seat part 625 and via the passage 615 inside the valve case 608. As a result, a damping force in accordance with the valve characteristic (damping force is approximately proportional to the piston speed) is generated.

Further, when the piston speed increases, and reaches a predetermined speed, the disc valve 626 separates from the valve seat part 624, and thus opens. As a result, the oil liquid flows to the reservoir chamber 6 via the gap between the open disc valve 626 and the valve seat part 624, the gap between the disc valve 632 and the valve seat part 625, and the passage 615 inside the valve case 608. As a result, a damping force in accordance with the valve characteristic (damping force is approximately proportional to the piston speed) is generated.

In this way, in the both strokes, which are the extension stroke and the compression stroke of the piston rod 21, the damping force generating mechanism 610 generates the damping force through the opening pressure in the orifice passage 629, the orifice passage 635, and the pilot valve 655 before the disc valve 626 and the disc valve 632 open, and generates the damping force corresponding to the opening degrees of the disc valve 626 and the disc valve 632 after the disc valve 626 and the disc valve 632 open. On this occasion, the damping force can directly be controlled independently of the piston speed by changing the opening pressure of the pilot valve 655 through the control current supplied to the coil 668 of the solenoid 610.

On the other hand, when a failure, for example disconnection of the coil 668 or failure of the onboard controller, occurs, and the thrust of the plunger 674 is lost, the pilot valve 655 is moved backward through the spring force of the return sprint 656, thereby opening the passage 653 of the pilot body 642, and the flange part 666 of the pilot valve 655 is caused to be brought into abutment against the disc valve 657 (failsafe disc valve), thereby closing the passage 657A of the disc valve 657. In this state, the oil liquid flowing from the passage 614 of the passage member 612 to the passage 615 in the valve case 608 via the passage 653 of the pilot body 642 can be controlled, that is, the damping force can be adjusted through the opening pressure of the disc valve 657, and, consequently, an appropriate damping force can be obtained even upon the failure.

Then, in the eighth embodiment, the damping force generating mechanism 610 is configured to change the damping force in accordance with the piston frequency even when the piston speed is the same. That is, in the extension stroke and the compression stroke, the oil liquid flowing from the passage 614 of the passage member 612 into the damping force generating mechanism 610 is introduced into the variable chamber 685 of the pilot chamber 644 via the orifice passage 646, the shaft hole 640A of the pilot pin 640, the passage 648 of the pilot body 642, and the passage 647A of the valve seat part 647. On this occasion, the flow rate of the oil liquid introduced into the variable chamber 685 changes in accordance with the piston frequency, and increases as the frequency increases as a result of a decrease in the oil liquid flowing toward a side of the orifice passage 629 and the orifice passage 635 via the passage 621. As a result, the free valve 675 receives the pressure in the variable chamber 685 of the pilot chamber 644, to thereby lift. That is, the free valve 675 deforms so that the disc 681 separates from the valve seat part 647 of the pilot pin 640 while sliding the packing 680 on the valve seat surface 677 in the state in which the inner peripheral edge portion of the disc 681 is supported by the annular surface 679A of the pilot body 642.

As a result of the deformation of the disc 681 in this way, the oil liquid in the variable chamber 686 (housing inner chamber) of the pilot chamber 644 flows to the reservoir chamber 6 via the passages 684 of the pilot body 642, the passage 656A of the return spring 656, the passage 657A (shaft hole) of the disc valve 657, the passage 658A of the holding plate 658, the passage 663 of the cap 662, and the passage 615 inside the valve case 608. Further, as a result of the deformation of the disc 681, the oil liquid is introduced from the passage 614 of the passage member 612 into the variable chamber 685 of the pilot chamber 644 via the orifice passage 646 of the pilot pin 640, the shaft hole 640A of the pilot pin 640, the passage 648 of the pilot body 642, and the passage 647A of the valve seat part 647. As a result, as the piston frequency increases, the flow rate of the oil liquid flowing from the passage 614 of the passage member 612 to the main valve 611 via the passage 621 of the valve member 613 decreases, and, as indicated by solid lines S1 (extension side) and S2 (compression side) of FIG. 19, a damping force of a soft characteristic is generated.

On the other hand, when the piston frequency is low, the amount of the oil liquid introduced from the passage 614 of the passage member 612 into the variable chamber 685 of the pilot chamber 644 via the orifice passage 646 of the pilot pin 640, the shaft hole 640A of the pilot pin 640, the passage 648 of the pilot body 642, and the passage 647A of the valve seat part 647 decreases compared with the amount when the piston frequency is high, and the lift amount (deformation amount) of the disc 681 of the free valve 675 decreases accordingly. As a result, the oil liquid flowing from the variable chamber 686 to the reservoir chamber 6 via the above-mentioned path decreases, and accordingly, such a state that the flow rate of the oil liquid flowing from the passage 614 of the passage member 612 to the main valve 611 via the passage 621 of the valve member 613 does not decrease is brought about, and, as indicated by thick solid lines H1 (extension side) and H2 (compression side) of FIG. 19, a damping force of a hard characteristic is generated. In a medium speed region of the piston frequency, as indicated by broken lines M1 (extension side) and M2 (compression side) of FIG. 19, a damping force of a medium characteristic is generated.

With the first embodiment, even in the damping force generating mechanism 601 of the type of controlling the thrust force of the actuator (solenoid 610), to thereby adjust the opening pressure of the pilot valve 655 (control valve), the damping force can be changed in response to the piston speed, and it is possible to simultaneously achieve shutoff (set the damping force characteristic to soft) of uncomfortable vibration at a high frequency transmitted from a road surface and suppression (set the damping force characteristic to hard) of a large vibration at a low frequency of the vehicle.

Ninth Embodiment

Figure 20:
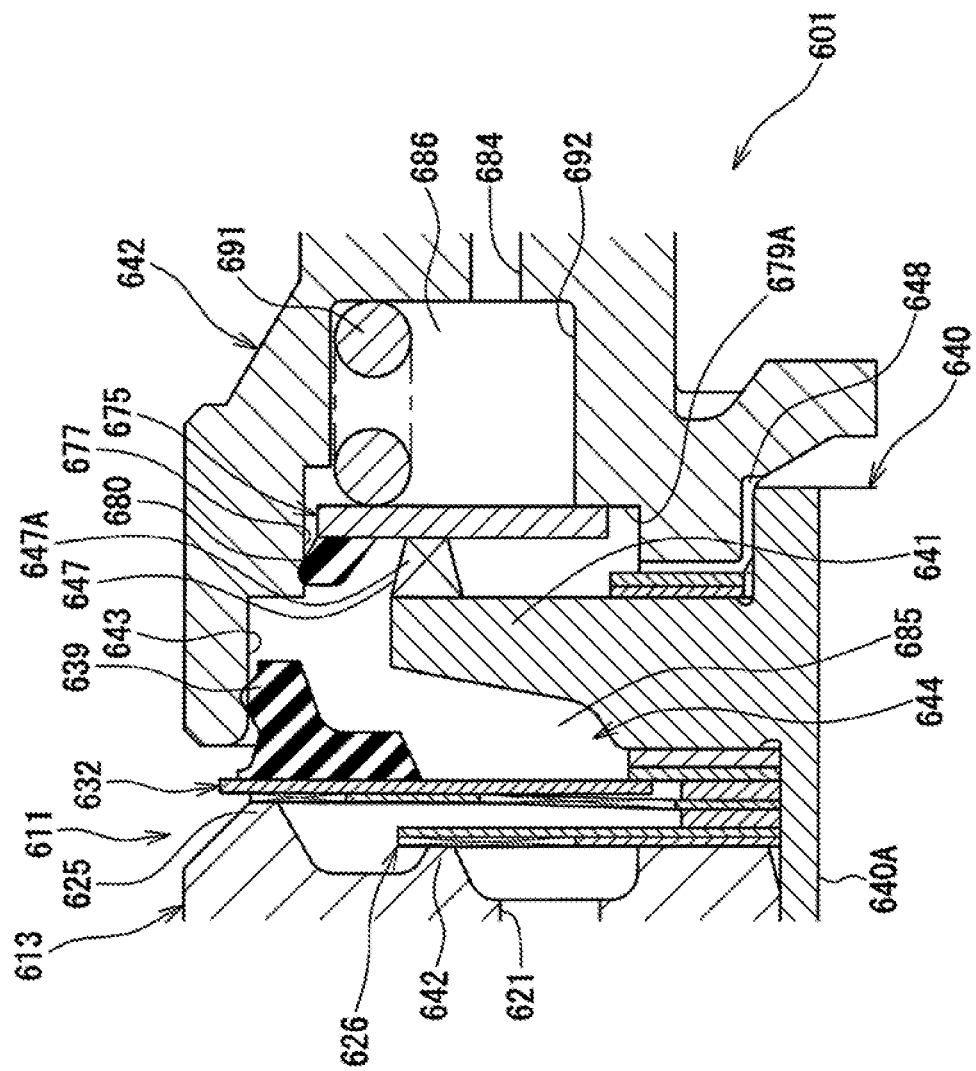
FIG. 20 is a partial sectional view for illustrating the shock absorber according to a ninth embodiment of the present invention, and is an illustration of a part around the damping force changing mechanism.

Next, with reference to mainly FIG. 20, description is made of a ninth embodiment mainly in terms of a difference from the eighth embodiment. The same terms and the same reference symbols are given to components which are common to those of the eighth embodiment.

As illustrated in FIG. 20, in the ninth embodiment, there is provided a cylindrical coil spring 691 defining a relative relationship between the pressure in the variable chamber 685 of the pilot chamber 644 and a lift amount of the free valve 675 (disc 681) when the free valve 675 lifts.

An annular recessed part 692 for receiving the coil spring 691 is formed in the pilot body 642. The annular recessed part 692 is coaxially provided on a bottom surface of the annular recessed part 676 of the pilot body 642, and has an outer diameter smaller than an outer diameter of the annular recessed part 676 and an inner diameter larger than an inner diameter of the annular recessed part 676. The coil spring 691 abuts against a portion outside (on an outer peripheral side of) a portion against which the valve seat part 647 abuts of a surface of the disc 681 on a variable chamber 686 (inner chamber) side.

With the ninth embodiment, the lift amount (deformation amount of the disc 691) of the free valve 675 when the piston frequency is high can be controlled through the coil spring 691. As a result, it is possible to expand an extent of setting of the damping force characteristic on the soft side generated when the piston frequency is high.

Figure 21:
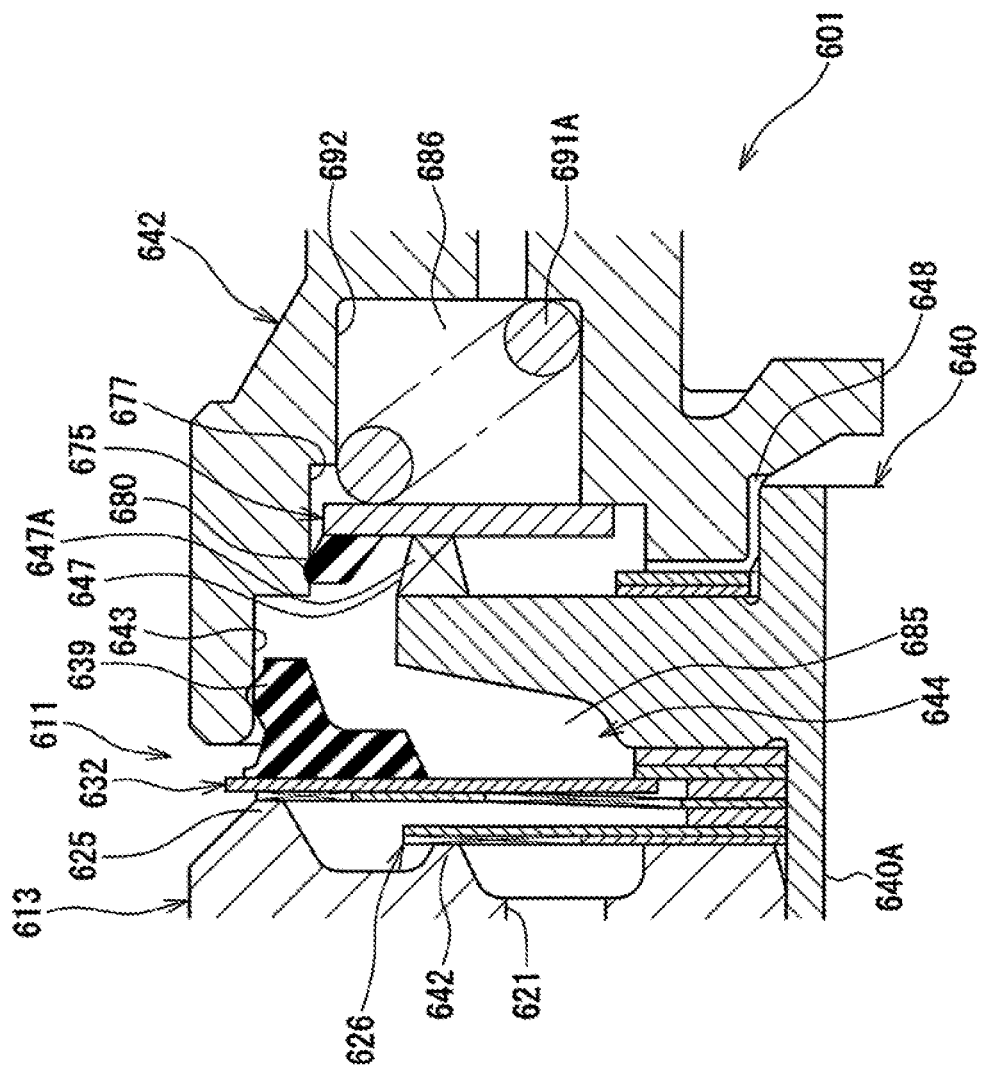
FIG. 21 is a partial sectional view for illustrating a modification of the ninth embodiment of the present invention, and is an illustration of a part around the damping force changing mechanism.

As the coil spring 691, in addition to a cylindrical shape illustrated in FIG. 20, for example, a conical coil spring 651A as illustrated in FIG. 21 can be applied.

REFERENCE SIGNS LIST 1 shock absorber, 2 cylinder, 18 piston, 19 upper chamber, 20 lower chamber, 21 piston rod, 41, 41B, 41D, 42, 42A damping force generating mechanism, 52, 52A main valve, 80, 80A pilot chamber, 101, 101B, 102, 102A first passage, 134, 134A, 134C partition disc (disc), 140, 140A case member, 171, 171A, 171E, 172, 172A variable chamber, 176 nut, 181, 181A, 181C second passage

The invention claimed is:

1. A shock absorber comprising:
a cylinder sealingly enclosing working fluid;
a piston slidably fitted in the cylinder and partitioning an inside of the cylinder into two chambers;
a piston rod including one end side coupled to the piston and an opposite end side extending to an outside of the cylinder;
a first passage allowing the working fluid to flow out from one of the chambers in the cylinder as a result of movement of the piston;
a second passage provided in parallel with the first passage;
a damping force generating mechanism provided in the first passage, and configured to generate a damping force;
a tubular case member including at least a part of the second passage formed therein;
a shaft part disposed in the case member;
a flexible annular disc disposed in the case member while being passed through by the shaft part, and supported on an inner peripheral side or an outer peripheral side, an annular elastic seal member configured to seal a gap between the flexible annular disc and the case member or a gap between the flexible annular disc and the shaft part on a non-supported side being provided; and
two chambers in the case member which are defined and provided by the disc,
wherein the disc is configured to block flow to at least one side of the second passage,
wherein an annular gap is provided between the disc and the case member or the shaft part, and
wherein the elastic seal member is provided by being fixed to both surfaces of the disc via the gap.

2. The shock absorber according to claim 1, wherein the shaft part is the one end side of the piston rod.

3. The shock absorber according to claim 1,
wherein the cylinder includes a reservoir chamber configured to compensate entry and exit of the piston rod, and
wherein the first passage and the second passage are provided between one of the chambers in the cylinder and the reservoir chamber.

4. The shock absorber according to claim 3, wherein a seal position of the seal member is provided on an upstream side of the disc during the flow to the one side.

5. The shock absorber according to claim 1, wherein the inner peripheral side of the disc is not clamped from both surface sides, and is supported only on one surface side.

6. The shock absorber according to claim 1,
wherein the damping force generating mechanism includes:
a main valve configured to suppress flow of the working fluid generated by a slide of the piston to generate the damping force; and
a pilot chamber configured to apply a pressure in a closing direction to the main valve, and
wherein the damping force generating mechanism is configured to introduce part of the flow of the working fluid into the pilot chamber to control opening of the main valve through the pressure in the pilot chamber.

7. A shock absorber comprising:

a cylinder sealingly enclosing working fluid;

a piston slidably fitted in the cylinder and partitioning an inside of the cylinder into two chambers;

a piston rod including one end side coupled to the piston and an opposite end side extending to an outside of the cylinder;

a first passage allowing the working fluid to flow out from one of the chambers in the cylinder as a result of movement of the piston;

a second passage provided in parallel with the first passage;

a damping force generating mechanism provided in the first passage, and configured to generate a damping force;

a tubular case member including at least a part of the second passage formed therein;

a shaft part disposed in the case member;

a flexible annular disc disposed in the case member while being passed through by the shaft part, and supported on an inner peripheral side or an outer peripheral side;

an annular elastic seal member configured to seal a gap between the flexible annular disc and the case member or a gap between the flexible annular disc and the shaft part on a non-supported side, wherein at least part of the elastic seal member is located on an opposite side to a surface on which the disc is supported; and two chambers in the case member which are defined and provided by the disc, wherein the disc is configured to block flow to at least one side of the second passage, and wherein the disc is configured to close the second passage throughout an extension stroke, and open the second passage in a compression stroke.

8. The shock absorber according to claim 7, wherein the flow to the opposite side is permitted via a supported side of the disc.

9. A shock absorber comprising:

a cylinder sealingly enclosing working fluid;

an outer tube provided around the cylinder;

a piston slidably fitted in the cylinder;

a piston rod coupled to the piston, and extending to an outside of the cylinder; and a damping force generating mechanism configured to control flow of working fluid generated by a slide of the piston in the cylinder to generate a damping force, wherein a tubular case for containing the damping force generating mechanism is provided in the outer tube;

wherein the shock absorber includes in the case:

a housing having a bottomed tubular shape;

a main valve provided so as to close an opening of the housing, and configured to control the flow of the fluid generated by the slide of the piston in the cylinder to generate the damping force;

a pilot chamber formed by the housing and the main valve, and configured to apply an inner pressure in a closing direction to the main valve;

an introduction passage configured to introduce the fluid into the pilot chamber;

a pilot passage configured to cause the pilot chamber and a downstream side of the main valve to communicate with each other; and a control valve provided in the pilot passage;

wherein a disc is provided in the pilot chamber so as to be movable relative to the housing, the disc forming a housing inner chamber between the disc and a bottom portion of the housing, and wherein a seal member, configured to seal a gap between an outer peripheral edge portion of the disc and an inner periphery of the housing is integrally provided on one surface of the outer peripheral edge portion of the disc, the one surface facing the pilot chamber, and wherein one surface of an inner peripheral edge portion of the disc is abutted on the housing, the one surface of the inner peripheral portion of the disc being opposite to the one surface of the outer peripheral portion of the disc.

* * * * *